United States Patent
Abrahamian et al.

(10) Patent No.: US 12,470,569 B2
(45) Date of Patent: Nov. 11, 2025

(54) ANOMALY DETECTION RELATING TO COMMUNICATIONS USING INFORMATION EMBEDDING

(71) Applicant: AT&T Intellectual Property I, L.P., Atlanta, GA (US)

(72) Inventors: Edmond J. Abrahamian, Richmond Heights, MO (US); Andrew Campbell, Pleasant Hill, CA (US); Ana Armenta, San Jose, CA (US); Prince Paulraj, Coppell, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 553 days.

(21) Appl. No.: 17/456,520

(22) Filed: Nov. 24, 2021

(65) Prior Publication Data

US 2023/0164150 A1 May 25, 2023

(51) Int. Cl.
*H04L 9/40* (2022.01)

(52) U.S. Cl.
CPC .............. *H04L 63/1416* (2013.01)

(58) Field of Classification Search
CPC ........... H04L 63/1416; H04L 63/1425; H04L 63/1433
USPC .......................................... 726/23
See application file for complete search history.

(56) References Cited

U.S. PATENT DOCUMENTS

| | | | | |
|---|---|---|---|---|
| 2010/0014664 A1* | 1/2010 | Shirai | ............... | H04L 9/003 380/28 |
| 2010/0146622 A1* | 6/2010 | Nordstrom | ............ | G06F 21/554 726/23 |
| 2015/0326605 A1* | 11/2015 | Small | ................ | H04L 63/1441 726/23 |

OTHER PUBLICATIONS

Abrahamian et al., "Efficient Generation, Storage, and Manipulation of Fully Flexible Pharmacophore Multiplets and Their Use in 3-D Similarity Searching," J. Chem. Inf. Comput. Sci., Jan. 28, 2003, 43, 2, 458-468, 11 pages.

* cited by examiner

*Primary Examiner* — Vivek Srivastava
*Assistant Examiner* — Hien V Doan

(57) ABSTRACT

Anomalies associated with events relating to users or user accounts can be detected. An anomaly detection management component (ADMC) determines embedded arrays comprising data bit groups representative of groups of properties and groups of relationships between properties associated with users, based on analysis of data related to events associated with users. ADMC trains a neural network (NN) based on applying embedded arrays to NN, in accordance with an artificial intelligence (AI) analysis process. ADMC determines an embedded array comprising data bits representative of properties and relationships between properties associated with a user based on analysis of data associated with the user. Trained NN can determine a pattern relating to the properties and relationships associated with the user based on AI-based analysis of the embedded array. Trained NN can detect an anomaly in the pattern based on AI-based analysis of the pattern, wherein the anomaly relates to an event.

20 Claims, 12 Drawing Sheets

ANOMALY DETECTION RELATING TO COMMUNICATIONS USING INFORMATION EMBEDDING

TECHNICAL FIELD

This disclosure relates generally to electronic communications, e.g., to anomaly detection relating to communications using information embedding.

BACKGROUND

Communication devices (and associated users) can communicate and otherwise interact with each other for a variety of purposes and applications. For instance, users can utilize communication devices for recreational purposes, entertainment purposes, business purposes, education purposes, or other desired purposes. Users can have user accounts and/or subscriptions with one or more entities (e.g., communication service provider, such as a wireless phone service provider, Internet service provider, and/or cable or satellite service provider) that can offer or provide products (e.g., smart phones, electronic tablets, computers, or other devices) and services (e.g., communication-related services) to the users.

The above-described description is merely intended to provide a contextual overview regarding electronic communications and is not intended to be exhaustive.

DETAILED DESCRIPTION

Figure 1:
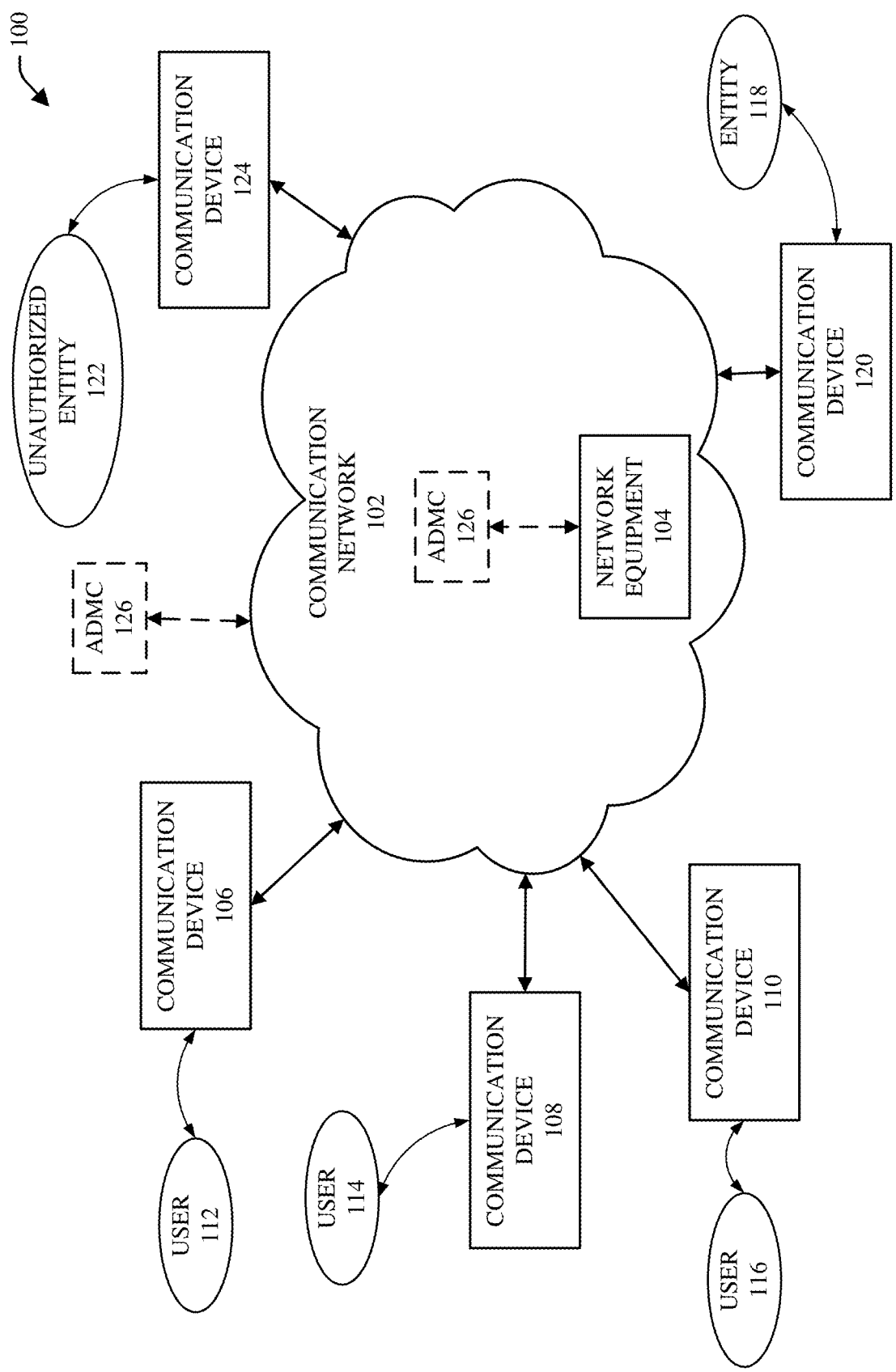
FIG. 1 illustrates a block diagram of an example system that can desirably detect anomalies relating to events and associated with users (e.g., associated with user accounts or communication devices associated with users), in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Users can use communication devices to communicate and otherwise interact with each other for a variety of purposes and applications. For instance, users can utilize communication devices for recreational purposes, entertainment purposes, business purposes, education purposes, or other desired purposes. Users can have user accounts and/or subscriptions with one or more entities (e.g., communication service provider, such as a wireless phone service provider, Internet service provider, and/or cable or satellite service provider) that can offer or provide products (e.g., smart phones, electronic tablets, computers, or other devices) and services (e.g., communication-related services) to the users.

Sometimes unauthorized entities (e.g., malicious, criminal, or otherwise unauthorized users or entities) can attempt to engage in undesirable (e.g., unauthorized, fraudulent, criminal, or otherwise undesirable) activities against user accounts associated with users and an entity (e.g., a service or product provider) with which the users can be associated. For example, an unauthorized entity can represent itself/himself/herself (e.g., can attempt to pass itself/himself/herself off) as being a user associated with a user account to an entity with which the user has a user account, and can improperly (e.g., fraudulently or criminally) attempt to purchase or upgrade to a new communication device (e.g., a new smart phone) under the user account of the user, where the cost of the new communication device can be improperly charged to the user (e.g., charged to the user account of the user and/or a financial account of the user that can be associated with the user account). Some of these unauthorized entities can be relatively savvy, and it can often be difficult to identify some of these unauthorized entities as being unauthorized with respect to a user account of a user.

Fraud can cost businesses a significant amount of money each year. To combat fraud, some existing business processes can rely on making individual determinations regarding whether an instance of fraud is occurring, which can be undesirably expensive to do on an individual basis and usually can undesirably involve deploying considerable resources (e.g., personnel resources, time resources, equipment resources, or other resources).

To that end, techniques for desirably detecting anomalies associated with events relating to users, user accounts, or communication devices are presented. The disclosed subject matter an anomaly detection management component (ADMC) that can determine respective embedded arrays comprising respective groups of bits of data that can be representative of respective groups of properties and respective groups of relationships between properties associated with respective users, based at least in part on an analysis of data related to events, interactions, activities, or communications associated with the users that can span a desired period(s) of time.

The ADMC can apply (e.g., input) the respective embedded arrays to a neural network. Based at least in part on the application of the embedded arrays (e.g., the respective groups of bits of data of the embedded arrays) to the neural network, the neural network can be trained to create a trained neural network, in accordance with an artificial intelligence (AI) analysis process and associated AI-based algorithm and techniques.

With regard to a particular user (e.g., user account or communication device associated with the user), the ADMC can determine an embedded array comprising bits of data that can be representative of respective properties and respective relationships between the respective properties associated with the user based at least in part on an analysis of data associated with the user (e.g., data relating to events, interactions, activities, or communications associated with the user, user account associated with the user, or communication device(s) associated with the user). The ADMC can apply the embedded array to the trained neural network. The trained neural network can determine a pattern relating to the respective properties and the respective relationships between the respective properties associated with the user based at least in part on an AI-based analysis of the bits of data of the embedded array. The trained neural network can detect (e.g., can automatically, dynamically, and/or intelligently detect) an anomaly in the pattern based at least in part on an AI-based analysis of the pattern, wherein the anomaly can relate to an event(s), interaction(s), activity(ies), or communication(s) associated with the user (e.g., associated with the user account or communication device associated with the user). The anomaly can be indicative of, for example, fraudulent activity associated with (e.g., against) the user account of the user, churn associated with the user account, robocall activity, spam activity. For example, the fraudulent activity, or potential fraudulent activity, comprise a fraudulent attempt to purchase or upgrade to a new communication device (e.g., a new smart phone charged under the user account of the user), a fraudulent attempt to swap a subscriber identity module (SIM) card associated with a communication device associated with the user account, a fraudulent attempt to add a line to the user account (e.g., where the new line can be utilized by a device of the fraudulent entity while the cost of the new line can be charged to the user account of the user), or other type of fraudulent activity associated with the user account of the user.

The ADMC can present (e.g., communicate or display) information (e.g., notification or alert message comprising information) relating to the anomaly to an entity, another device or component, and/or the user to facilitate notifying the entity, the other device or component, and/or the user of the detected anomaly associated with the user (e.g., associated with the user account or communication device of the user). This can enable the entity (e.g., human or virtual assistant (VA) representative associated with the entity), the other device or component (or the ADMC), and/or the user to take a desired action (e.g., responsive or mitigation action) to determine whether the anomaly actually involves undesired (e.g., unauthorized, fraudulent, criminal, and/or otherwise undesired) activity and/or prevent (e.g., block) or mitigate the undesired activity (if it is determined that there is undesired activity) and/or prevent uncharacterized activity (e.g., as a precautionary measure, prevent, or at least temporarily prevent, an activity that has not (at least yet) been determined to be undesired). If, for example, the anomaly relates to potential churn associated with the user, the entity (e.g., representative associated with the entity) can take a desired action (e.g., present an offer for a communication device, other product, and/or service) to the user.

The disclosed subject matter, by employing the ADMC, trained neural networks, and the techniques described herein, can enhance (e.g., improve or optimize) detection of undesired (e.g., unauthorized, fraudulent, criminal, and/or otherwise undesired) activities associated with user accounts or communication devices associated with users, and mitigation and prevention of such undesired activities, as compared to existing techniques for detecting unauthorized or fraudulent activities. Also, the disclosed subject matter, by employing the ADMC, trained neural networks, and the techniques described herein, can mitigate (e.g., reduce or minimize) or prevent churn associated with user accounts and associated products and services. In accordance with various embodiments, the disclosed subject matter, by employing the ADMC, trained neural networks, and the techniques described herein, can mitigate (e.g., reduce or minimize) or prevent undesired robocalls or spam calls associated with a communication device of the user, and/or attacks against the communication network. The disclosed subject matter, by employing the ADMC, trained neural networks, and the techniques described herein, also can enhance sales and marketing of products and services to users (e.g., customers or potential customers).

These and other aspects and embodiments of the disclosed subject matter will now be described with respect to the drawings.

Referring now to the drawings, FIG. 1 illustrates a block diagram of an example system 100 that can desirably detect anomalies relating to events and associated with users (e.g., associated with user accounts or communication devices associated with users), in accordance with various aspects and embodiments of the disclosed subject matter. The system 100 can comprise a communication network 102 that can comprise a packet data network (e.g., an Internet Protocol (IP)-based network, such as the Internet and/or intranet) and/or a mobility core network (e.g., a wireless communication network), wherein the packet data network can be associated with (e.g., communicatively connected to) the mobility core network. The packet data network can be or can comprise the Internet or an intranet. The communication network 102 can comprise various network equipment 104 that can facilitate communication of data traffic in or associated with the communication network 102. The network equipment 104 can comprise servers, routers, access points (e.g., base stations or cells, or other type of access point), gateways, modems, network nodes, hubs, bridges, switches, processors, data stores, or other type of network equipment that can facilitate wireline or wireless communication of data traffic in or associated with the communication network 102. The network equipment 104 also can comprise or facilitate the generation (e.g., creation) or instantiation of virtualized network equipment, components, and/or functions (e.g., virtualized processors, servers, controllers, applications, and/or other desired components or functions), which can be employed, for example, to facilitate edge computing and services (e.g., mobile edge computing and other edge services), network slicing (e.g., generation or instantiation of network slices), network security, and/or other desired network uses or services.

At various times, communication devices, such as, for example, communication device 106, communication device 108, and/or communication device 110, associated with users, such as user 112, user 114, and user 116, can be associated with (e.g., communicatively connected to) the communication network 102 to communicate with other communication devices that are associated with the communication network 102. For instance, a user (e.g., 112) can utilize a communication device (e.g., 106) to make a phone call or communicate a message via the communication network 102, to another communication device (e.g., 108) to communicate information to the other communication device or request information from the other communication device. A communication device (e.g., 106) can communicate with the communication network 102 using a wireless communication connection or a wireline communication connection.

A communication device (e.g., 106, 108, or 110) also can be referred to as, for example, a device, a mobile device, a mobile communication device, user equipment (UE), a terminal, or a mobile terminal, or by other similar terminology. A communication device can refer to any type of wireline device or wireless device that can communicate with the communication network 102, wherein a wireless device can communicate with a radio network node in a core network (e.g., a cellular or mobile communication system) of the communication network 102. Examples of communication devices can include, but are not limited to, a computer (e.g., a desktop computer, a server, a laptop embedded equipment (LEE), a laptop mounted equipment (LME), or other type of computer), a phone (e.g., a smart phone, cellular phone, or other type of phone that can utilize applications), a tablet or pad (e.g., an electronic tablet or pad), an electronic notebook, a Personal Digital Assistant (PDA), a device to device (D2D) UE, a machine type UE or a UE capable of machine to machine (M2M) communication, a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of device or sensor), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, or an oven, or other type of appliance having wireless communication functionality), a set-top box, an IP television (IPTV), a device associated or integrated with a vehicle (e.g., automobile, airplane, bus, train, or ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs).

Users (e.g., 112, 114, and 116) can have user accounts and/or subscriptions with one or more entities (e.g., service or product providers), such as entity 118, that can offer and/or provide products (e.g., communication devices, accessories for communication devices, or other products) and services (e.g., communication-related services) to the users. The entity 118 can have one or more representatives (e.g., sales, service, or technical support representatives) who can act on behalf of the entity 118, wherein the one or more representatives can be human users or VAs. The entity 118 can have one or more communication devices, such as communication device 120, that can be associated with (e.g., communicatively connected to) the communication network 102 and can be used by the representatives of the entity 118 to interact with customers and/or potential customers, such as one or more of the users (e.g., 112, 114, and/or 116).

There can be instances where an unauthorized entity 122 (e.g., malicious, criminal, or otherwise unauthorized user or entity) can attempt to engage in undesirable (e.g., unauthorized, fraudulent, criminal, or otherwise undesirable) activities against a user account(s) associated with a user(s) (e.g., user 112) and an entity (e.g., entity 118) with which the users (e.g., 112, 114, and/or 116) can be associated. In some instances, the unauthorized entity 122 is able to provide identification or authentication information relating to a user (e.g., user 112) and or user account of the user that can be sufficient to convince a device or a representative associated with the entity 118 that the unauthorized entity 122 is the user and/or is otherwise authorized to engage in activity (e.g., purchase products or services) associated with or under the user account of the user (e.g., user 112). As some examples, an unauthorized entity 122 can utilize a communication device 124 to improperly (e.g., fraudulently or illegally) represent as being a user (e.g., user 112) associated with a user account to the entity 118 with which the user has a user account, and can improperly (e.g., fraudulently or illegally) attempt to purchase or upgrade to a new communication device (e.g., a new smart phone) under the user account of the user, where the cost of the new communication device can be improperly charged to the user (e.g., charged to the user account of the user and/or a financial account of the user that can be associated with the user account), attempt to add a line to the user account of the user, attempt to change (e.g., swap) SIM cards associated with the user account of the user, and/or attempt to add the unauthorized entity 122 or another unauthorized entity as an "authorized user" on the user account. Other undesirable activities the unauthorized entity 122 can engage in can include, for example, robocalls and spam calls. It can be desirable to detect such unauthorized and/or undesirable activities by unauthorized entities, such as unauthorized entity 122, and associated communication devices (e.g., communication device 124), and prevent or mitigate such unauthorized and/or undesirable activities by unauthorized entities.

In accordance with various embodiments, to facilitate detecting, preventing, and/or mitigating such unauthorized and/or undesirable activities by unauthorized entities, the system 100 can comprise an anomaly detection management component (ADMC) 126 that can desirably (e.g., suitably, acceptably, and/or optimally; and automatically, dynamically, and/or intelligently) detect, determine, identify, infer, or predict anomalies associated with users (e.g., associated with user accounts associated with users (e.g., 112, 114, and/or 116) based at least in part on analysis of data relating to events, interactions, activities, or communications associated with (or ostensibly associated with) users and/or previous analysis of data relating to previous events, interactions, activities, or communications associated with users (e.g., other users), in accordance with defined anomaly detection criteria, such as more fully described herein. An anomaly can be indicative of, and/or can relate or potentially can relate to, undesirable (e.g., unauthorized, fraudulent, improper, criminal, unwanted, or otherwise undesirable) activity (e.g., undesirably activity associated with a user, user account of the user, or communication device associated with the user), such as described herein. In accordance with various embodiments, the ADMC 126 can be part of the communication network 102, can be associated with the communication network 102 (e.g., can be located outside of but communicatively connected to the communication network 102), or a desired combination thereof.

Figure 2:
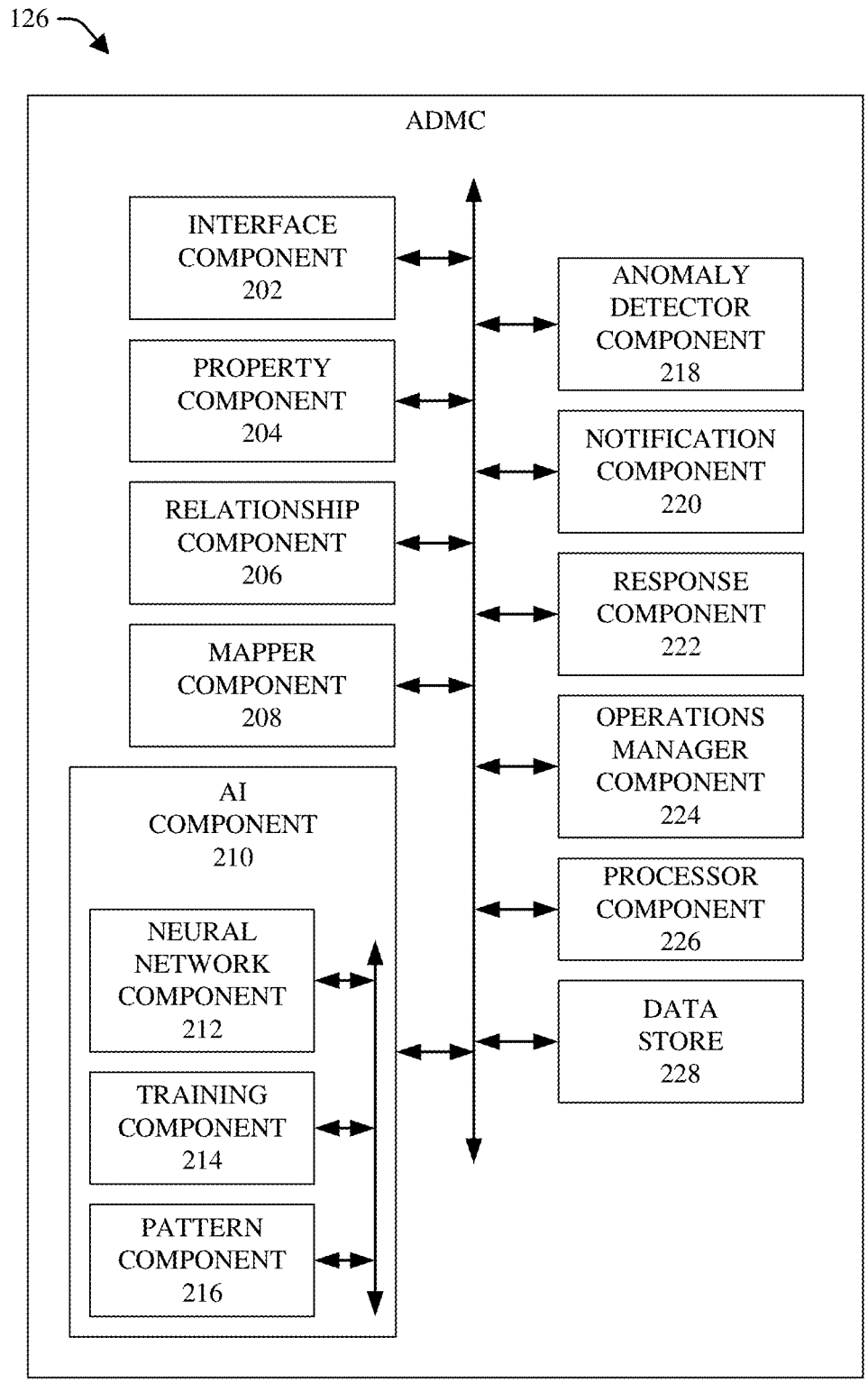
FIG. 2 depicts a block diagram of an example anomaly detection management component, in accordance with various aspects and embodiments of the disclosed subject matter.

Referring to FIG. 2 (along with FIG. 1), FIG. 2 depicts a block diagram of an example ADMC 126, in accordance with various aspects and embodiments of the disclosed subject matter. As shown in FIG. 2, the ADMC 126 can comprise an interface component 202, a property component 204, a relationship component 206, a mapper component 208, and an AI component 210, which can include a neural network component 212, a training component 214, and a pattern component 216. The ADMC 126 also can comprise an anomaly detector component 218, a notification component 220, a response component 222, an operations manager component 224, a processor component 226, and a data store 228.

The ADMC 126 can obtain (e.g., receive, collect, and/or aggregate), via the communication network 102, a large amount (e.g., volume) of data relating to the communication network 102, communication devices (e.g., 106 108, 120 and/or 124), users (e.g., 112, 114, and/or 116), entities (e.g., entities, such as entity 118, and/or unauthorized entities, such as unauthorized entity 122), services (e.g., services of or associated with the communication network 102), applications (e.g., applications of or associated with the communication network 102), user accounts associated with users, products, events, interactions, activities, and/or communications. Some of the data can relate to, for example, events relating to users, communication devices, and/or user accounts associated with the users; interactions or communications between users and other users and/or between communication devices of users and other communication devices of other users; and/or activities associated with users, communication devices, and/or user accounts associated with the users. Some of the data (e.g., global positioning system (GPS) data, network measurement or network-related data, or other location-related data) can relate to locations of communication devices associated with users. The network measurement or network-related data can comprise, for example, reference signal received power (RSRP), reference signal received quality (RSRQ), radio resource control (RRC) measurements, signal to interference plus noise ratio (SINR), received signal strength indicator (RSSI), channel quality indicator (CQI), throughput, throughput rate, bandwidth, quality of service (QoS), quality of experience (QoE), call data records (CDRs), and/or other network measurements or data.

The interface component 202 can be or can comprise one or more gateways, one or more application programming interfaces (APIs), one or more graphical user interfaces (GUIs), one or more other interfaces, and/or one or more other tools that can facilitate (e.g., enable) communication of data between the ADMC 126 and communication devices or other devices (e.g., network equipment 104), and/or facilitate presenting (e.g., displaying or communicating) desired data to users. The ADMC 126 can receive data from the communication network 102 and/or communication devices (e.g., 106 108, 120 and/or 124) via the interface component 202 and can communicate data to the communication network 102 and/or communication devices (e.g., 106 108, 120 and/or 124) via the interface component 202.

The ADMC 126 can analyze the data (e.g., data relating to users, communication devices, user accounts associated with users, events, interactions, activities, or communications) to facilitate determining or identifying properties associated with users and relationships between the properties, which can be utilized to facilitate detecting anomalies relating to events, interactions, activities, or communications associated with users (e.g., associated with user accounts or communication devices associated with users). In some embodiments, the ADMC 126 can employ the AI component 210 (e.g., in conjunction with the property component 204 and/or relationship component 206) to perform an AI-based analysis (e.g., AI, machine learning (ML), or other type of AI analysis) on the data, using desired AI-based algorithms, models, and/or techniques, to facilitate determining or identifying properties associated with users and relationships between the properties.

The ADMC 126, employing the property component 204, relationship component 206, mapper component 208, and/or AI component 210, can map activities, events, properties, and relationships between properties to an embedded array solution space (e.g., a bitmap solution space), and the ADMC 126 can utilize the embedded array of that embedded array solution space to train a neural network to be a trained neural network (e.g., trained discriminative neural network) that can detect whether there are any anomalies in embedded arrays analyzed using the trained neural network, as more fully described herein.

The property component 204 can determine or identify respective groups of properties (e.g., attributes or characteristics) associated with respective users (e.g., users 112, 114, and/or 116) and relating to respective events, interactions, activities, or communications associated with the respective users based at least in part on the results of the analysis of such data. A property can relate to, for example, a "user" (e.g., where the "user" can be a user (e.g., 112) actually associated with the user account or an unauthorized entity 122 representing himself/herself/itself as being the user) requesting an upgrade, or upgrading, of a communication device and/or requesting to purchase, or purchasing, a communication device, a "user" requesting to add or adding another entity to the user account, a "user" attempting to add a line or adding a line to the user account, a "user" interacting with a webpage(s) of an online store of the entity 118 (e.g., where the webpage(s) presents offers relating to products or services), a "user" requesting to swap, or swapping, a SIM card associated with the user account to a different SIM card, a location from which the "user" is contacting the entity 118 or a representative of the entity 118 with regard to the user account (e.g., to add an authorized user to the user account, to add a line to the user account, to upgrade communication device, or to take another action with regard to the user account), a location of the communication device (e.g., 106) associated with the user account, a usage state or type of usage of the communication device (e.g., 106) associated with the user account, a robocall, a spam call, and/or a "user" having or associated with another type of event, interaction, activity, or communication (e.g., in connection with the user account).

The relationship component 206 can determine or identify respective groups of relationships between properties associated with the respective users (e.g., users 112, 114, and/or 116) based at least in part on the results of the analysis of such data, including the respective groups of properties determined or identified by the property component 204. A relationship between properties can provide or facilitate providing context between the properties associated with the relationship. A relationship between properties can relate to, for example, an amount of time that has elapsed between a first event, interaction, activity, or communication associated with a first property and a second event, interaction, activity, or communication associated with a second property, a first location associated with the first property in relation to a second location associated with the second property, a relationship between a first type of property (e.g., a first type of event, interaction, activity, or communication associated with the first property) and a second type of property (e.g., a second type of event, interaction, activity, or communication associated with the second property), and/or another type of relationship between at least two properties. In some embodiments, the relationship component 206 can determine that there is more than one relationship (e.g., time relationship, location or spatial relationship, and/or another type of relationship) between two properties, the relationship is a complex (e.g., multi-dimensional) relationship between two properties (e.g., a complex relationship comprising a time-related component, a location or spatial-related component, and/or another type of relationship component), and/or the relationship is between more than two properties.

Based at least in part on the respective groups of properties (e.g., attributes or characteristics) associated with respective users (e.g., users 112, 114, and/or 116) and/or the respective groups of relationships between properties associated with the respective users, the mapper component 208 can embed, map, or code the respective groups of properties associated with the respective users (e.g., users 112, 114, and/or 116) and/or the respective groups of relationships between properties to generate respective embedded arrays comprising respective groups of bits of data that can be representative of (e.g., can relate or correspond to, or can be indicative of) the respective events, interactions, activities, or communications associated with the respective users. The mapper component 208 can embed or map properties and relationships between properties in an embedded array, comprising bits of data, such that the embedded array can represent a fingerprint of the properties, relationships between properties, and associated events and activities for any given type of entity (e.g., a user account associated with a user). For instance, for each property of a group of properties associated with a user (e.g., associated with a user account or communication device associated with the user (e.g., 112, 114, or 116)), the mapper component 208 can embed, map, or code a property by inserting a particular bit of data having a particular bit value to a particular bit location in the embedded array based at least in part on the type of property, the context associated with the property (e.g., context of or associated with an event, interaction, activity, or communication associated with the property), an outcome associated with the property, a cost, magnitude, or other value associated with the property, and/or another feature associated with the property. A magnitude or other type of value can be or can relate to, for example, a time value (e.g., a particular time, an amount of time, or other time-related value), a location-related value (e.g., GPS coordinate value, geospatial coordinate value, a distance value (e.g., distance between two locations, entities, or things), or other location-related value), or other desired type of magnitude or value. The bit value of the bit of data and the location of the bit of data in the embedded array can be representative or indicative of the property. For instance, a first type of property can be associated with a first bit of data in a first location (e.g., first slot or cell) of the embedded array, and a second type of property can be associated with a second bit of data in a second location (e.g., second slot or cell) of the embedded array. A bit of data (e.g., an item of data in a slot of the embedded array) can contain, for example, a Boolean value (e.g., binary digit, such as 1 or 0 (or can be an empty bit location)), an integer value, a floating point number, a complex value, a shape (e.g., a shape representative of a value), an indicator (e.g., an indicator representative of a value), or an alphanumeric value. In some embodiments, an embedded array can be or can comprise a bitmap.

For each relationship of a group of relationship between properties associated with a user (e.g., associated with a user account or communication device associated with the user (e.g., 112, 114, or 116)), the mapper component 208 can embed, map, or code a relationship between properties by inserting a particular bit of data having a particular bit value to a particular bit location in the embedded array based at least in part on the type of relationship, the context associated with the relationship (e.g., context of or associated with events, interactions, activities, or communications associated with the properties that are related), an outcome associated with the relationship, a cost(s), magnitude(s), or other value(s) associated with the properties associated with the relationship, and/or another feature associated with the relationship between properties. The bit value of the bit of data and the location of the bit of data in the embedded array can be representative or indicative of the relationship between properties. For instance, a first type of relationship between properties can be associated with a first bit of data in a first location of the embedded array, and a second type of relationship between properties can be associated with a second bit of data in a second location of the embedded array. In some embodiments, the location of the bit of data relating to (e.g., representative or indicative of) a relationship between properties in the embedded array can based at least in part on the respective locations of the bits of data relating to the properties in the embedded array.

In certain embodiments, the mapper component 208 can embed, map, or code a property or a relationship between properties by inserting a particular bit of data to one location of respective bit locations in the embedded array based at least in part on the property or relationship type, the context associated with the property or relationship, an outcome associated with the property or relationship, a cost(s), magnitude(s), or other value(s) associated with the property or relationship, and/or another feature associated with the property or relationship. For example, if Boolean values are being utilized, with regard to a relationship between a first property associated with a first event and a second property associated with a second event, the mapper component 208 can insert the bit of data in one of two or more bit locations in the embedded array based at least in part on, e.g., a value(s) (e.g., a cost(s), magnitude(s), or other value(s)) associated with the properties or the relationship, wherein the number of bit locations allocated as being available to represent the relationship in the embedded array can be as desired, in accordance with the defined anomaly detection criteria. For instance, if there are three available bit locations allocated in the embedded array to represent the relationship, the mapper component 208 can insert the bit of data (e.g., a 1 value) in a first bit location of the embedded array if the value associated with the relationship is a first value or within a first range of values (e.g., 0 to 5 hours; or 0 to 5 miles), can insert the bit of data (e.g., a 1 value) in a second bit location of the embedded array if the value associated with the relationship is a second value or within a second range of values (e.g., greater than 5 hours to 10 hours; or greater than 5 miles to 10 miles), or can insert the bit of data (e.g., a 1 value) in a third bit location of the embedded array if the value associated with the relationship is a third value or within a third range of values (e.g., greater than 10 hours to 20 hours (or any value greater than 20 hours); or greater than 10 miles to 20 miles (or any value greater than 20 hours)).

In some embodiments, the ADMC 126 can compress the bits of data in the embedded array to, for example, reduce the amount of space utilized by the bits of data of the embedded array. For instance, an embedded array may comprise a relatively larger number of bit locations (e.g., 64 bit locations, 128 bit locations, or more) and may have a significant number of bit locations that do not contain a bit of data (e.g., empty bit locations) or that contain a same data bit value. The ADMC 126 can compress the bits of data of the embedded array using a desired data compression algorithm and techniques.

Figure 3:
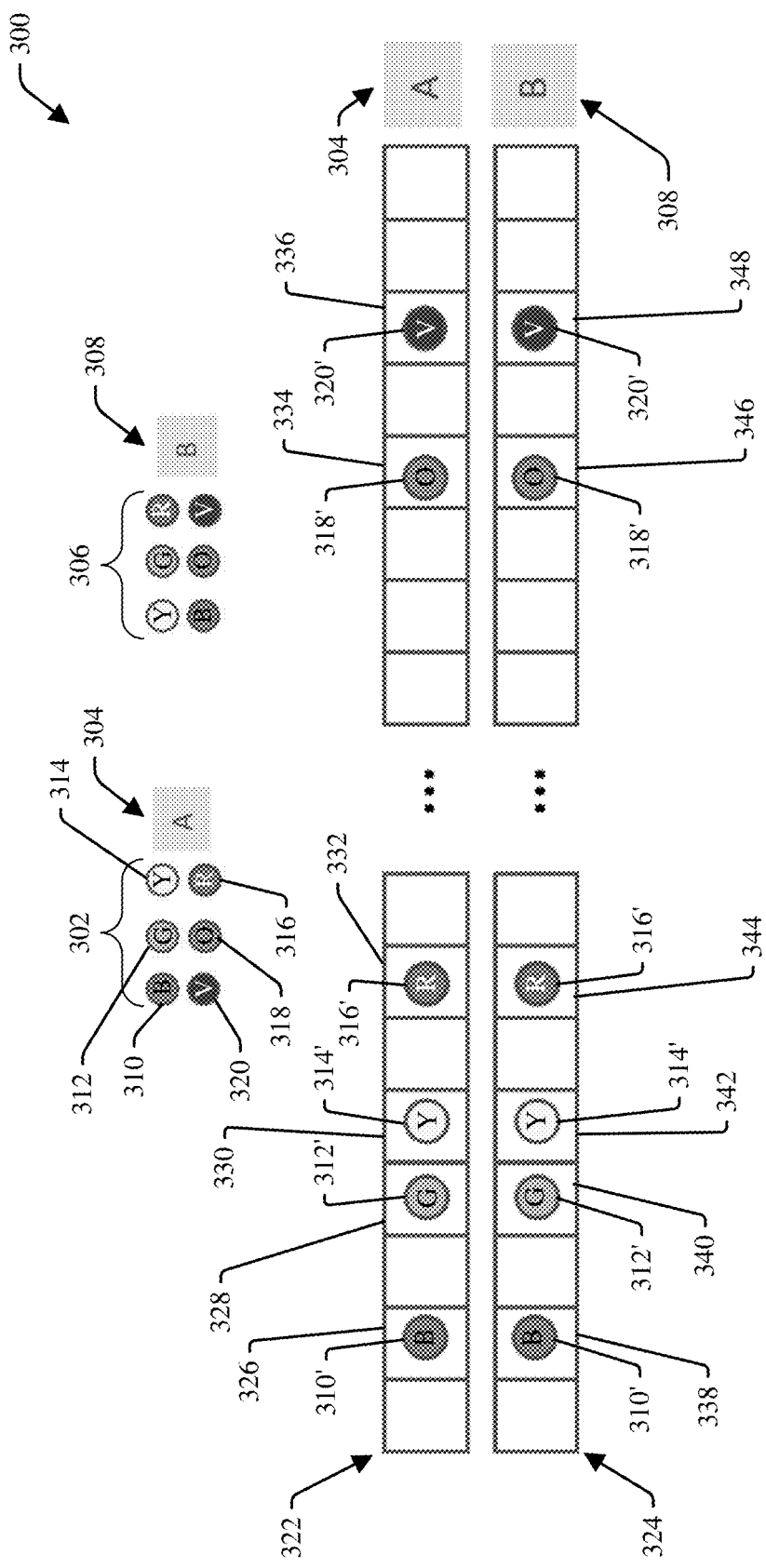
FIG. 3 depicts a diagram of example respective embedded arrays comprising bits of data that can be representative of respective properties associated with respective users, in accordance with various aspects and embodiments of the disclosed subject matter.

Referring to FIG. 3 (along with FIGS. 1 and 2), FIG. 3 depicts a diagram of example respective embedded arrays 300 comprising bits of data that can be representative of respective properties associated with respective users, in accordance with various aspects and embodiments of the disclosed subject matter. The embedded arrays 300 of FIG. 3 can facilitate illustrating certain features and aspects of the disclosed subject matter with regard to embedded arrays. The embedded arrays 300 can relate to a first group of records 302 associated with user A 304, and a second group of records 306 associated with user B 308, wherein the first group of records 302 and the second group of records 306 can have or share the same group of properties. With regard to these example record groups (e.g., 302 and 306), there can be six properties (e.g., six types of properties), for example, comprising a first property 310 (e.g., circle with "B" inside), second property 312 (e.g., circle with "G" inside), third property 314 (e.g., circle with "Y" inside), fourth property 316 (e.g., circle with "R" inside), fifth property 318 (e.g., circle with "O" inside), and sixth property 320 (e.g., circle with "V" inside). As can be observed, while the first group of records 302 and the second group of records 306 have the same six properties, the properties are in different orders in the first group of records 302 and the second group of records 306. These properties (e.g., 310 through 320) can be determined by the property component 204 based at least in part on the results of analyzing respective data, comprising the first group of records 302 and second group of records 306, associated with user A 304 and user B 308.

The mapper component 208 can embed the respective properties (e.g., 310 through 320) associated with the first group of records 302 associated with user A 304 and the second group of records 306 associated with user B 308 to form (e.g., create or generate) a first embedded array 322 (embedded array A) and a second embedded array 324 (embedded array B). The first embedded array 322 can comprise respective bits of data that can be representative of and correspond to the respective properties (e.g., 310 through 320) associated with the first group of records 302. Similarly, the first embedded array 322 can comprise respective bits of data that can be representative of and correspond to the respective properties (e.g., 310 through 320) associated with the second group of records 306. For instance, the mapper component 208 can embed the first property 310 as a first bit of data 310' in a second location 326 of the first embedded array 322, the second property 312 as a second bit of data 312' in a fourth location 328 of the first embedded array 322, the third property 314 as a third bit of data 314' in a fifth location 330 of the first embedded array 322, the fourth property 316 as a fourth bit of data 316' in a seventh location 332 of the first embedded array 322, the fifth property 318 as a fifth bit of data 318' in another location 334 of the first embedded array 322, and the sixth property 320 as a sixth bit of data 320' in still another location 336 of the first embedded array 322. Similarly, the mapper component 208 can embed the first property 310 as a first bit of data 310' in a second location 338 of the second embedded array 324, the second property 312 as a second bit of data 312' in a fourth location 340 of the second embedded array 324, the third property 314 as a third bit of data 314' in a fifth location 342 of the second embedded array 324, the fourth property 316 as a fourth bit of data 316' in a seventh location 344 of the second embedded array 324, the fifth property 318 as a fifth bit of data 318' in another location 346 of the second embedded array 324, and the sixth property 320 as a sixth bit of data 320' in still another location 348 of the second embedded array 324.

Figure 4:
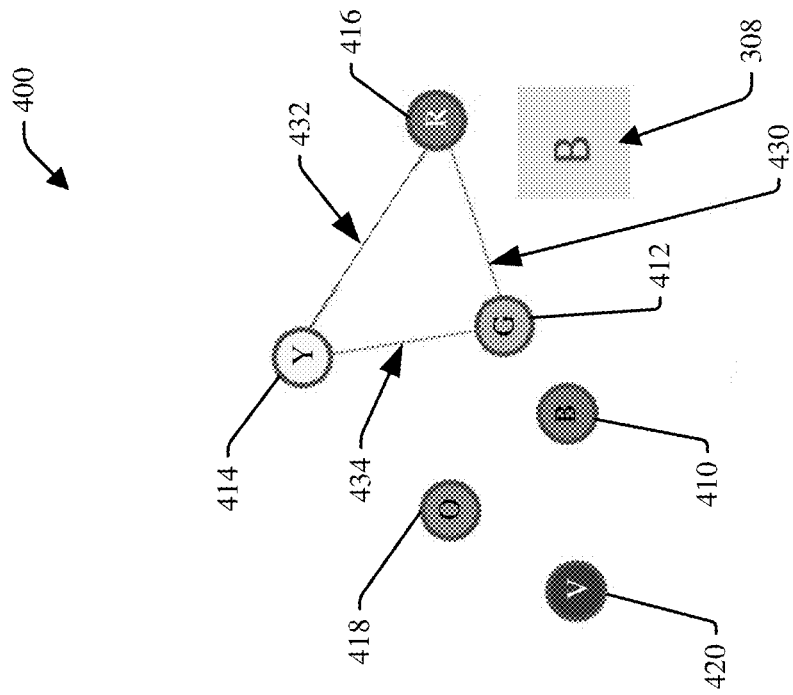
FIG. 4 depicts a diagram of example respective space-time representations associated with respective groups of properties and respective groups of relationships between properties associated with respective users, in accordance with various aspects and embodiments of the disclosed subject matter.
Figure 4:
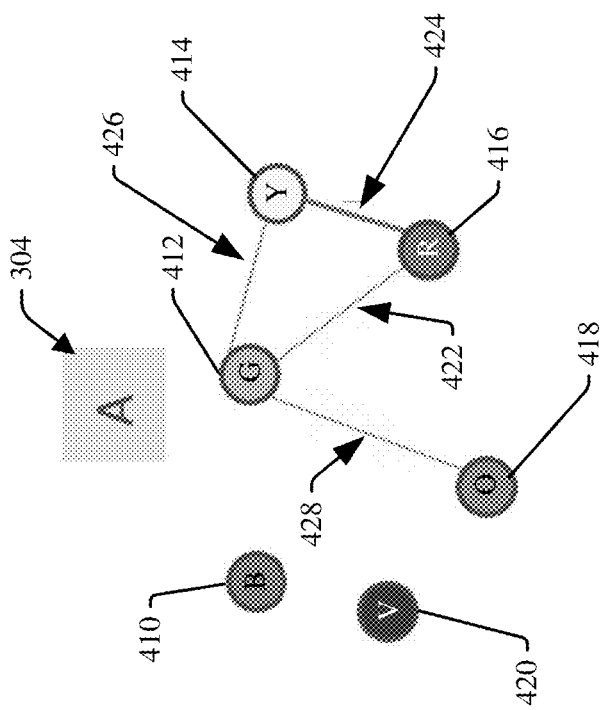

Turning to FIG. 4 (along with FIGS. 1, 2, and 3), FIG. 4 depicts a diagram of example respective space-time representations 400 associated with respective groups of properties and respective groups of relationships between properties associated with respective users (e.g., user A 304 and user B 308), in accordance with various aspects and embodiments of the disclosed subject matter. The example respective space-time representations 400 can comprise a first space-time representation 402, representative of a first group of properties and a first group of relationships between properties and associated with the first group of records 302 associated with user A 304, and a second space-time representation 404, representative of a second group of properties and a second group of relationships between properties, and associated with the second group of records 306 associated with user B 308. The first space-time representation 402 and the second space-time representation 404 can have the respective properties plotted or represented as respective data points to account for and/or represent time features (e.g., time attributes, such as time of occurrence of an event and/or length of time between events) and spatial features associated with the properties.

The properties can comprise the example six properties referenced with regard to the embedded arrays 300 of FIG. 3, with the properties comprising the first property 410 (e.g., circle with "B" inside), second property 412 (e.g., circle with "G" inside), third property 414 (e.g., circle with "Y"

inside), fourth property 416 (e.g., circle with "R" inside), fifth property 418 (e.g., circle with "O" inside), and sixth property 420 (e.g., circle with "V" inside) (respectively corresponding to the first property 310, second property 312, third property 314, fourth property 316, fifth property 318, and sixth property 320 of the embedded arrays 300 of FIG. 3). As can be observed in the first space-time representation 402 and the second space-time representation 404, while each contain the same six properties, the space-time representation of the six properties in the second space-time representation 404 can be different from the space-time representation of the six properties in the first space-time representation 402 due to differences in the times that the properties occurred (e.g., times of events, interactions, activities, or communications, or other time-related features) with respect to the first space-time representation 402 and the second space-time representation 404, and/or due to differences in space-related features (e.g., locations of events, interactions, activities, or communications, or other space-related features) with respect to the first space-time representation 402 and the second space-time representation 404.

With regard to the relationships, the relationship component 206 can determine the respective (e.g., first and second) groups of relationships between properties based at least in part on the results of analyzing respective data, comprising the first group of records 302 and second group of records 306, associated with user A 304 and user B 308. For instance, based at least in part on the data analysis results, the relationship component 206 can determine the first group of relationships between properties comprising a relationship 422 between second property 412 and fourth property 416, a relationship 424 between third property 414 and fourth property 416, a relationship 426 between second property 412 and third property 414, and a relationship 428 between second property 412 and fifth property 418. Also, based at least in part on the data analysis results, the relationship component 206 can determine the second group of relationships between properties comprising a relationship 430 between second property 412 and fourth property 416, a relationship 432 between third property 414 and fourth property 416, and a relationship 434 between second property 412 and third property 414. As can be observed in the first space-time representation 402 and the second space-time representation 404, the first group of relationships (e.g., 422, 424, 426, and 428) and the second group of relationships (e.g., 430, 432, and 434) can have differences between them, for example, with regard to time and space, with regard to the number of relationships, and with regard to which properties have relationships to other properties.

Typically, the more properties and/or relationships that exist in embedded arrays, the more discriminating an embedded array can be in terms of its use by the ADMC 126 in detecting or identifying anomalous behaviors associated with properties and/or relationships.

Figure 5:
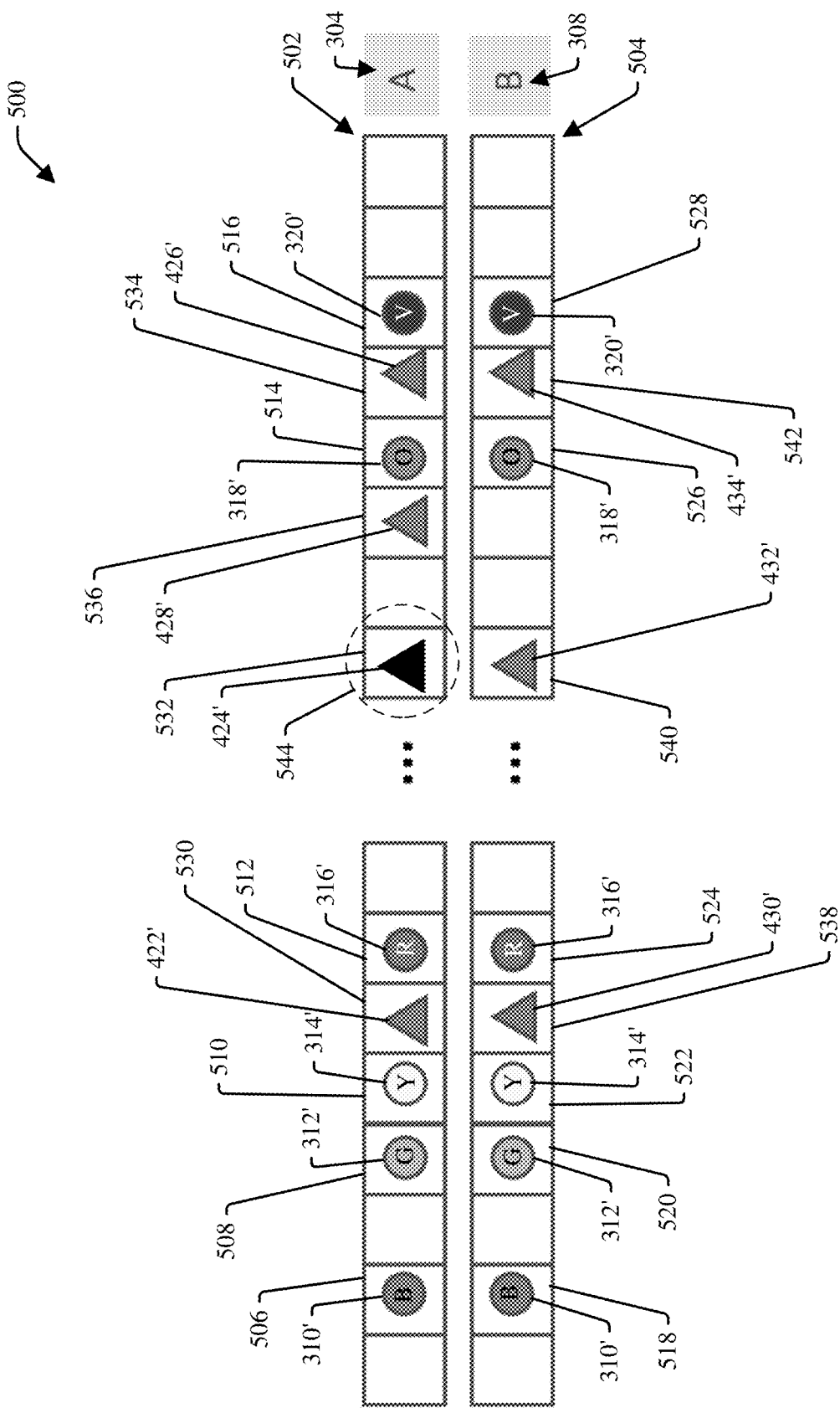
FIG. 5 illustrates a diagram of example respective embedded arrays comprising respective groups of bits of data that can be representative of respective groups of properties and respective groups of relationships between properties associated with respective users, in accordance with various aspects and embodiments of the disclosed subject matter.

Referring to FIG. 5 (along with FIGS. 1, 2, 3, and 4), FIG. 5 illustrates a diagram of example respective embedded arrays 500 comprising respective groups of bits of data that can be representative of respective groups of properties and respective groups of relationships between properties associated with respective users (e.g., user A 304 and user B 308), in accordance with various aspects and embodiments of the disclosed subject matter. As disclosed, in addition to embedding or mapping the properties to embedded arrays, the mapper component 208 can embed, map, or code relationships between properties to embedded arrays, where the relationships can be relatively basic relationships or can be relatively more complex relationships. The embedded arrays can be of a desired size (e.g., a desired number of bit locations and/or bits of data). It can be desirable for an embedded array to be large enough in size (e.g., to have a sufficient number of bit locations and/or bits of data) to enable the entire solution space to be expressed. In some embodiments, bits in the embedded array can consistently refer to a given property or feature in the domain space or can refer to a relationship between properties.

The respective embedded arrays 500 can comprise a first embedded array 502 associated with user A 304 (e.g., corresponding to the first embedded array 322 of FIG. 3) and a second embedded array 504 associated with user B 308 (e.g., corresponding to the second embedded array 324 of FIG. 3). The mapper component 208 can embed the first property 310 as a first bit of data 310' in a second location 506 of the first embedded array 502, the second property 312 as a second bit of data 312' in a fourth location 508 of the first embedded array 502, the third property 314 as a third bit of data 314' in a fifth location 510 of the first embedded array 502, the fourth property 316 as a fourth bit of data 316' in a seventh location 512 of the first embedded array 502, the fifth property 318 as a fifth bit of data 318' in another location 514 of the first embedded array 502, and the sixth property 320 as a sixth bit of data 320' in still another location 516 of the first embedded array 502. Similarly, the mapper component 208 can embed the first property 310 as a first bit of data 310' in a second location 518 of the second embedded array 504, the second property 312 as a second bit of data 312' in a fourth location 520 of the second embedded array 504, the third property 314 as a third bit of data 314' in a fifth location 522 of the second embedded array 504, the fourth property 316 as a fourth bit of data 316' in a seventh location 524 of the second embedded array 504, the fifth property 318 as a fifth bit of data 318' in another location 526 of the second embedded array 504, and the sixth property 320 as a sixth bit of data 320' in still another location 528 of the second embedded array 504.

With regard to the records of the properties of the embedded arrays 502 and 504, the properties can represent what may seem like disjointed, reasonable activities that user accounts can experience. However, when the embedded arrays are augmented with relationships among those properties, the records and associated embedded arrays can or may reveal different insights with regard to whether the activities associated with user accounts are reasonable and benign (e.g., non-anomalous) or whether the activities are anomalous and/or fraudulent or otherwise undesirable (e.g., unreasonable, unwanted, or otherwise undesirable).

At the same time as embedding the properties and/or in parallel with the embedding of the properties in an embedding array, or at a different time (e.g., subsequent to) than the embedding of the properties in the embedding array, the mapper component 208 can embed, map, or code the relationships between properties to the embedding array. With regard to the first embedded array 502, the mapper component 208 can embed, map, or code (e.g., encode) the first group of relationships to the first embedded array 502. For instance, the mapper component 208 can embed, map, or code the relationship 422 between second property 412 and fourth property 416 as a bit of data 422' in a sixth location 530 of the first embedded array 502, the relationship 424 between third property 414 and fourth property 416 as a bit of data 424' in another location 532 of the first embedded array 502, the relationship 426 between second property 412 and third property 414 as a bit of data 426' in still another location 534 of the first embedded array 502, and the relationship 428 between second property 412 and fifth property 418 as a bit of data 428' in yet another location 536 of the first embedded array 502.

With regard to the second embedded array 504, the mapper component 208 can embed, map, or code the second group of relationships to the second embedded array 504. For instance, the mapper component 208 can embed, map, or code the relationship 430 between second property 412 and fourth property 416 as a bit of data 430' in a sixth location 538 of the second embedded array 504, the relationship 432 between third property 414 and fourth property 416 as a bit of data 432' in another location 540 of the second embedded array 504, and a relationship 434 between second property 412 and third property 414 as a bit of data 434' in another location 542 of the second embedded array 504. In some embodiments, for consistency and to facilitate training a neural network and/or use of a trained neural network (e.g., analyzing, comparing between, and/or discriminating between bit patterns of embedded arrays (e.g., by a trained neural network)), the mapper component 208 can embed or map bits of data in embedded arrays such that a bit location (e.g., sixth bit location) of a bit of data representative of a relationship between a first property and a second property in a first embedded array can correspond to (e.g., be the same as) a bit location (e.g., sixth bit location) of another bit of data representative of another relationship between the first property and the second property in a second embedded array.

As can be observed in the first embedded array 502 and the second embedded array 504, there can be an anomaly 544 with regard to the relationship 424 between third property 414 and fourth property 416 (of FIG. 4) as indicated by the bit of data 424' in location 532 of the first embedded array 502 (of FIG. 5), for example, in relation to the relationship 432 (e.g., corresponding relationship) between third property 414 and fourth property 416 as indicated by the bit of data 432' in location 540 of the second embedded array 504. For instance, if there is a relatively significant (e.g., larger) number of embedded arrays that contain bits of data relating to a relationship between third property 414 and fourth property 416 that are relatively similar in nature (e.g., a time and/or space nature) to the bit of data 432' in location 540 of the second embedded array 504 (e.g., representative of the relationship 432 between third property 414 and fourth property 416), and the bit of data 424' in location 532 of the first embedded array 502 (e.g., representative of the relationship 424 between third property 414 and fourth property 416) is relatively different from those other embedded arrays, this can indicate that there is an anomaly 544 with regard to the relationship 424 between third property 414 and fourth property 416. The ADMC 126 can employ a trained neural network to detect, determine, identify, infer, or predict anomalies, such as anomaly 544, in embedded arrays comprising bits of data associated with properties and/or relationships between properties, such as described herein.

Figure 6:
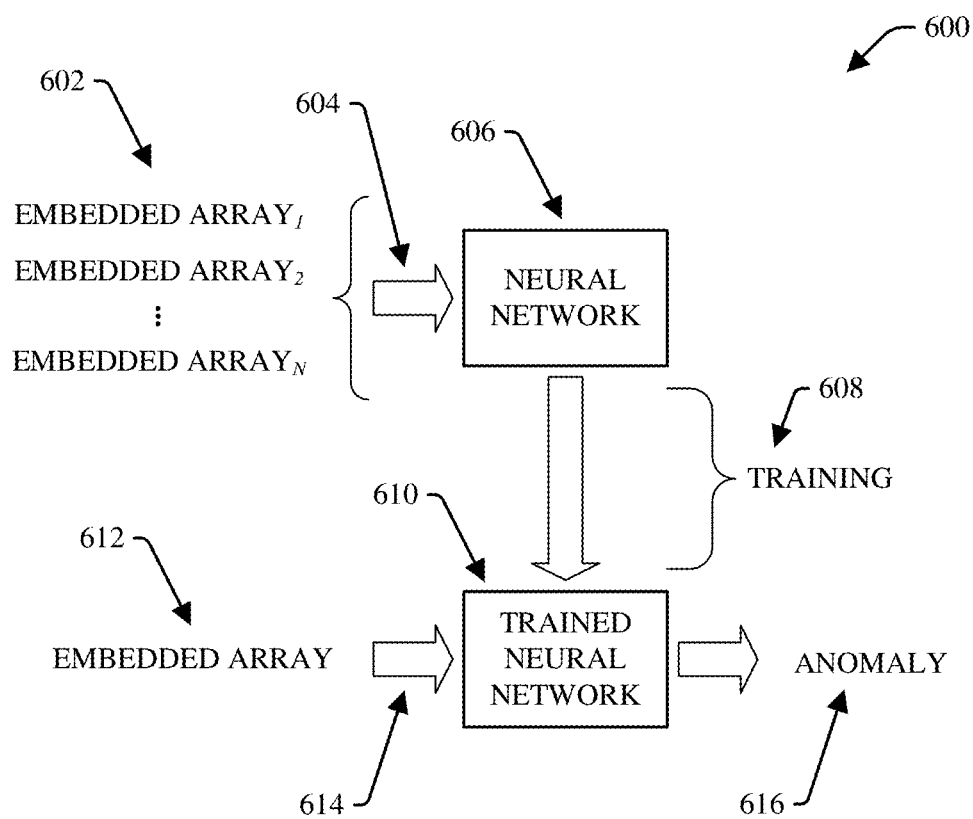
FIG. 6 illustrates a diagram of an example neural network training and anomaly detection process flow 600, in accordance with various aspects and embodiments of the disclosed subject matter.

With regard to trained neural networks, the ADMC 126 can employ the AI component 210 to train neural networks of the neural network component 212 based at least in part on embedded arrays comprising bits of data relating to properties and relationships between properties, wherein the trained neural networks can be utilized to detect, determine, identify, infer, or predict anomalies (e.g., anomaly 544) in embedded arrays (e.g., patterns of bits of data of embedded arrays), or, if desired, detect, determine, identify, infer, or predict similarities in embedded arrays (e.g., similarities in patterns of bits of data of embedded arrays). Referring to FIG. 6 (along with FIGS. 1, 2, 3, 4, and 5), FIG. 6 illustrates a diagram of an example neural network training and anomaly detection process flow 600, in accordance with various aspects and embodiments of the disclosed subject matter. As indicated at reference numeral 602 of the example neural network training and anomaly detection process flow 600, the ADMC 126, employing the property component 204, relationship component 206, mapper component 208, AI component 210, and/or another component of or associated with the ADMC 126, can generate a desired number of respective embedded arrays, comprising embedded arrays, embedded array$_2$ up through embedded array$_N$ (where N can be virtually any desired integer value), associated with respective users (e.g., respective users, and/or user accounts and/or communication devices associated with respective users), based at least in part on the results of analyzing data associated with users, wherein the respective embedded arrays can comprise respective groups of bits of data that can be representative of respective groups of properties and respective groups of relationships between properties associated with the respective users, such as more fully described herein. In some embodiments, the respective embedded arrays can comprise a first subgroup (e.g., first subset) of embedded arrays that can comprise groups of bits of data relating to groups of properties and groups of relationships between properties that can be known to be associated with non-anomalous (e.g., benign or non-fraudulent) behavior associated with users, user accounts, and/or communication devices, and a second subgroup (e.g., second subset) of embedded arrays that can comprise groups of bits of data relating to groups of properties and groups of relationships between properties that can be known to be associated with anomalous (e.g., fraudulent, other undesirable, or otherwise anomalous) behavior associated with users, user accounts, and/or communication devices, to facilitate enabling a neural network to be trained to learn to discriminate, distinguish, determine, or identify between non-anomalous behavior and anomalous behavior associated with users, user accounts, and/or communication devices. As part of the example neural network training and anomaly detection process flow 600, the AI component 210, employing the training component 214, can enable the neural network of the neural network component 212 to know which embedded arrays (e.g., the first subgroup of embedded arrays) relate to non-anomalous behavior and which embedded arrays (e.g., the second subgroup of embedded arrays) relate to anomalous behavior to facilitate enabling the neural network to be trained to learn to discriminate, distinguish, determine, or identify between non-anomalous behavior and anomalous behavior associated with users, user accounts, and/or communication devices.

As indicated at reference numeral 604 of the example neural network training and anomaly detection process flow 600, the AI component 210 can apply (e.g., input) the respective embedded arrays, comprising the respective groups of bits of data, to a neural network 606 to facilitate training the neural network. As indicated at reference numeral 608 of the example neural network training and anomaly detection process flow 600, the AI component 210, employing the training component 214 and desired AI-based algorithms, models, and/or techniques, can train the neural network 606, based at least in part on the application of the respective groups of bits of data of the respective embedded arrays to the neural network 606, to generate a trained neural network 610 that can desirably (e.g., accurately, suitably, quickly, efficiently, enhancedly, and/or optimally) detect, determine, identify, infer, or predict anomalies (e.g., anomaly 544) in embedded arrays (e.g., anomalies in patterns of bits of data of embedded arrays), in accordance with the defined anomaly detection criteria. Additionally or alternatively, if and as desired, the AI component 210, employing the training component 214 and desired AI-based algorithms, models, and/or techniques, can train another neural network of the neural network component 212 to generate another trained neural network that can desirably detect, determine, identify, infer, or predict similarities in embedded arrays (e.g., similarities in patterns of bits of data of embedded arrays), which can be used for other desired purposes, such as more fully described herein.

With the trained neural network 610 being desirably trained, as indicated at reference numeral 612 of the example neural network training and anomaly detection process flow 600, the ADMC 126, employing the property component 204, relationship component 206, mapper component 208, AI component 210, and/or another component of or associated with the ADMC 126, can generate an embedded array associated with a user (e.g., a user and/or a user account and/or communication device(s) associated with the user), based at least in part on the results of analyzing data associated with the user, wherein the embedded array can comprise a group of bits of data that can be representative of properties and relationships between properties associated with the user, such as more fully described herein. In some embodiments, the ADMC 126 can analyze the data and, based at least in part on the results of analyzing the data, generate the embedded array associated with the user in real or near real time.

As indicated at reference numeral 614 of the example neural network training and anomaly detection process flow 600, the ADMC 126 can apply (e.g., input) the embedded array, comprising the group of bits of data, to the trained neural network 610 (e.g., of the neural network component 212) to facilitate desirably (e.g., accurately, suitably, quickly, efficiently, enhancedly, and/or optimally) determining whether there is an anomaly (e.g., abnormality, irregularity) in the bits of data of the embedded array (e.g., an anomaly in the pattern of the bits of data of the embedded array), for example, relative to the first subgroup of embedded arrays (e.g., as compared to the patterns of the bits of data of the embedded arrays of the first subgroup of embedded arrays) associated with non-anomalous behavior associated with users, user accounts, and/or communication devices. The AI component 210 and the trained neural network 610 can utilize the pattern component 216 to determine, identify, recognize, or infer a pattern(s) in the embedded array and respective patterns of the respective embedded arrays that were utilized to train the trained neural network 610 to facilitate determining, identifying, recognizing, or inferring any difference(s) between the pattern(s) in the embedded array (e.g., pattern(s) in the bits of data of the embedded array) and the respective patterns of the respective embedded arrays (e.g., respective patterns in the respective bits of data of the respective embedded arrays used for training of the trained neural network 610). In some embodiments, the trained neural network 610 can analyze the embedded array and, based at least in part on the results of analyzing the embedded array, can determine whether there is an anomaly in the embedded array in real or near real time.

In some embodiments, even after training a neural network to create a trained neural network (e.g., trained neural network 610), the AI component 210 can continue to train the trained neural network by applying additional embedded arrays comprising bits of data (e.g., and new or additional data is obtained) to refine or improve the performance of the trained neural network with regard to rendering detections, determinations, or inferences (e.g., detections, determinations, or inferences of anomalies in data patterns in bits of data of an embedded arrays). In certain embodiments, additionally or alternatively, the AI component 210 can receive feedback information from entities (e.g., representatives or other personnel of entities), wherein the feedback information can indicate whether particular detections, determinations, or inferences (e.g., anomaly detections, determinations, or inferences, or other detections, determinations, or inferences) made by the trained neural network are accurate (e.g., accurate or correct) or not. The AI component 210 can update the trained neural network based at least in part on the feedback information or input information relating to the feedback information to facilitate refining or improving the performance of the trained neural network with regard to rendering detections, determinations, or inferences (e.g., anomaly detections, determinations, or inferences, or other detections, determinations, or inferences).

To illustrate some examples of anomaly detection, with further reference to the first embedded array 502 and second embedded array 504, the second embedded array 504 can represent a normal set of properties associated with a user (e.g., user B 308), and the first embedded array 502 associated with user A 304 can be under analysis by the trained neural network 610. Based at least in part on the results of analyzing (e.g., performing an AI-based analysis) on the bits of data of the first embedded array 502, the trained neural network 610 can detect, determine, identify, or infer that there is an anomaly 544 with regard to the bit of data 424' in location 532 of the first embedded array 502, wherein the bit of data 424' can be representative of the relationship 424 between third property 414 and fourth property 416, such as more fully described herein. For reasons of brevity and clarity, the same embedded arrays 502 and 504 are being used with regard to different example scenarios. It is to be appreciated and understood that, under different scenarios, the bit locations of the bits of data in an embedded array, the number of bits in the embedded array, the number of properties and the number of relationships associated with the bits of data in the embedded array, and/or other characteristics associated with the embedded array can vary depending on the data associated with the scenario and the events and relationships associated with the scenario, and also, the space-time representation associated with the scenario can vary depending on the data associated with the scenario and the events and relationships associated with the scenario.

As an example, the fourth property 416 can represent or relate to the adding of a new user as an authorized user or an ostensibly "authorized" user on the user account associated with a user at a first time, and the third property 414 can represent or relate to a request or order for an upgrade of a communication device (e.g., smart phone) associated with the user account by the newly authorized user or ostensibly "authorized" user. The event of adding a new user as an authorized user, in and of itself (e.g., when considered in isolation), usually can be a benign (e.g., non-anomalous) event. The event of requesting or ordering an upgrade of a communication device, in and of itself (e.g., when considered in isolation), also typically can be a benign (e.g., non-anomalous) event.

With regard to the second embedded array 504 (which can represent a normal case that can be used to facilitate training the trained neural network 610), the relationship 432' between third property 414 and fourth property 416 can relate to the length of time between the occurrence of the event (e.g., adding of an new user as an authorized user) associated with the fourth property 416 and the other event (e.g., the newly authorized user requesting or ordering an upgrade of a communication device under the user account associated with the user) associated with the third property 414, wherein the relationship 432' can indicate that a relatively longer amount of time (e.g., 17 hours) elapsed between the time the event associated with the fourth property 416 occurred and the time the other event associated with the third property 414 occurred. This relatively longer amount of time between those events can be determined to be relatively normal and not associated with fraudulent or otherwise abnormal or undesirable behavior (e.g., based on a number of instances and associated embedded arrays indicating such relatively longer amount of time between those events is not associated with, correlated with, or indicative of fraudulent, abnormal, or otherwise undesirable behavior).

In contrast, with regard to the first embedded array 502, the relationship 424' between third property 414 and fourth property 416 can indicate that a relatively short amount of time (e.g., 28 minutes) elapsed between the time the event associated with the fourth property 416 occurred and the time the other event associated with the third property 414 occurred. This relatively short amount of time between adding the new authorized user to the user account associated with the user and the newly authorized user requesting or ordering an upgrade of a communication device under the user account associated with the user can be indicative of fraud by an unauthorized entity 122 and/or an associated entity (e.g., the newly "authorized" user added to the user account), as it can be determined that an unauthorized entity (e.g., 122) or an associated entity can be more likely to wait a relatively short amount of time between adding (e.g., fraudulently or improperly adding) a new "authorized" user to a user account associated with a user and having the newly (fraudulently or improperly) "authorized" user or the unauthorized entity (e.g., 122) requesting or ordering an upgrade of a communication device under the user account associated with the user. Based at least in part on the trained neural network 610 determining that the amount of time (e.g., 28 minutes) between the occurrence of the event associated with the fourth property 416 and the occurrence of the other event associated with the third property 414 is relatively and abnormally short, the trained neural network 610 can detect, determine, identify, or infer that the relationship 424' between third property 414 and fourth property 416 is an anomaly (e.g., anomaly 544) and/or indicates fraudulent, or at least potentially fraudulent, activity.

As another example, the fourth property 416 can represent or relate to a location of a communication device (e.g., smart phone) of a user associated with a user account at a particular time, and the third property 414 can represent or relate to someone calling the entity 118 (e.g., a representative associated with the entity 118 that provides communication services associated with the user account of a user) and requesting to change (e.g., swap) the SIM card associated with the user account of the user (e.g., change the SIM card associated with that communication device by deactivating the SIM card associated with that communication device and activating a SIM card on another communication device) at that same particular time (or alternatively, someone calling the entity 118 to request to add a line to the user account of the user). The event of requesting to change the SIM card associated with a user account of the user (or alternatively, the event of requesting to add a line to the user account of the user), in and of itself (e.g., when considered in isolation), usually can be a benign event. In a scenario involving fraudulent activity, the request to change the SIM card can involve, for example, a request by an unauthorized entity 122 (who may be representing as an authorized entity and may not be known to be an unauthorized entity with regard to a user account) to deactivate a SIM card associated with that communication device associated with the user account and activate a SIM card on another communication device in connection with the user account.

With regard to the second embedded array 504, the relationship 432' between third property 414 and fourth property 416 can relate to the location of the communication device of the user associated with the fourth property 416 and the location of the other event (e.g., requesting to change the SIM card (or alternatively, requesting to add a line to the user account of the user)) associated with the third property 414, wherein the relationship 432' can indicate that the location of the communication device of the user associated with the fourth property 416 is the same, or substantially the same, as the location where the phone call is being made to request a change to the SIM card associated with the user account of the user (or alternatively, the location where the phone call is being made to request to add a line to the user account of the user), which can be associated with the third property 414. The location of the communication device being the same or substantially the same as the location from which the phone call requesting the change to the SIM card associated with the user account of the user (or alternatively, the location from which the phone call requesting to add a line to the user account of the user) can indicate that the events appear to be relatively normal and not associated with fraudulent or otherwise abnormal or undesirable behavior (e.g., based on a number of instances and associated embedded arrays indicating such events occurring at same or substantially same location (e.g., at the same time) is not associated with, correlated with, or indicative of fraudulent, abnormal, or otherwise undesirable behavior).

In contrast, with regard to the first embedded array 502, the relationship 424' between third property 414 and fourth property 416 can indicate that the location of the communication device associated with the user and user account, associated with the fourth property 416, is relatively far away from the location of the other event (e.g., the phone call to request a change to the SIM card associated with the user account (or alternatively the phone call to request to add a line to the user account of the user) associated with the third property 414. This relatively large distance between the location of the communication device associated with the user account and the user and the location from which the phone call is being made to request a change to the SIM card associated with the user account of the user (or alternatively, the location from which the phone call is being made to request to add a line to the user account of the user) can be indicative of fraud by an unauthorized entity 122, as it can be determined (e.g., by the trained neural network 610) that it can be unlikely and/or unusual that the user (e.g., authorized user) associated with the communication device and the user account would be calling to request a change to the SIM card associated with the user account (or alternatively, calling to request to add a line to the user account of the user) while at one location, while, at the same time, the communication device of the user is located relatively far away from the location of the phone call. Based at least in part on the trained neural network 610 determining that the location of the communication device associated with the user account and user, associated with the fourth property 416, and the location of the other event (e.g., phone call to change the SIM card associated with the user account (or alternatively, phone call to request to add a line to the user account) associated with the third property 414 are relatively far away from each other, the trained neural network 610 can detect, determine, identify, or infer that the relationship 424' between third property 414 and fourth property 416 is an anomaly (e.g., anomaly 544) and/or indicates fraudulent, or at least potentially fraudulent, activity.

As another example, the fourth property 416 can represent or relate to someone, representing as being the user associated with the user account, attempting to add a new user as an authorized user or an ostensibly "authorized" user on the user account associated with a user at a first time, and the third property 414 can represent or relate to a phone call being made on a communication device (e.g., smart phone) of the user associated with the user account. The event of adding a new user as an authorized user, in and of itself (e.g., when considered in isolation), usually can be a benign (e.g., non-anomalous) event. The event of making a phone call on a communication device, in and of itself (e.g., when considered in isolation), also typically can be a benign (e.g., non-anomalous) event.

With regard to the second embedded array 504, the relationship 432' between third property 414 and fourth property 416 can relate to the length of time between the occurrence of the event (e.g., adding of an new user as an authorized user) associated with the fourth property 416 and the other event (e.g., making the phone call) associated with the third property 414, wherein the relationship 432' can indicate that a relatively longer amount of time (e.g., 5 hours) elapsed between the time the event (e.g., adding of an new user as an authorized user) associated with the fourth property 416 occurred and the time the other event (e.g., making the phone call) associated with the third property 414 occurred. This relatively longer amount of time between those events can be determined to be relatively normal and not associated with fraudulent or otherwise abnormal or undesirable behavior (e.g., based on a number of instances and associated embedded arrays indicating such relatively longer amount of time between those events is not associated with, correlated with, or indicative of fraudulent, abnormal, or otherwise undesirable behavior).

In contrast, with regard to the first embedded array 502, the relationship 424' between third property 414 and fourth property 416 can indicate that the time of the event associated with the fourth property 416 (e.g., adding a new authorized user to the user account) occurred and the time the other event (e.g., making the phone call) associated with the third property 414 occurred overlap each other. Such overlapping of the time of adding the new authorized user to the user account associated with the user while at the same time a phone is being made on the communication device of the user associated with the user account can be indicative of fraud by an unauthorized entity 122, as it can be determined (e.g., by the trained neural network 610) that the user associated with the account is not likely to be making a phone call at the same time the user is attempting to add an authorized user to the user account, and thus, it is likely that the act of attempting to add an authorized user to the user account can be, or at least potentially can be, fraudulent activity by the unauthorized entity 122. Based at least in part on the trained neural network 610 determining that the times of the occurrence of the event associated with the fourth property 416 and the occurrence of the other event associated with the third property 414 overlap each other, the trained neural network 610 can detect, determine, identify, or infer that the relationship 424' between third property 414 and fourth property 416 is an anomaly (e.g., anomaly 544) and/or indicates fraudulent, or at least potentially fraudulent, activity by the unauthorized entity 122.

Another example can relate to someone accessing an online store of a website of an entity 118 to purchase a communication device (or other product or service) from the online store under the user account associated with a user (e.g., user 112). In this example scenario, the fourth property 416 can represent or relate to someone interacting with or accessing web pages of a website of an online store associated with the entity 118 at a first time, and the third property 414 can represent or relate to that someone purchasing a communication device (e.g., smart phone) via a web page of the online store website at a second time. The events of interacting with or accessing web pages of the website of the online store associated with the entity 118, in and of themselves (e.g., when considered in isolation), often can be a non-anomalous event.

With regard to the second embedded array 504 (which can represent a normal case that can be used to facilitate training the trained neural network 610), the relationship 432' between third property 414 and fourth property 416 can relate to the length of time between the occurrence of the event(s) (e.g., first interacting with or accessing web pages of the online store website at the first time) associated with the fourth property 416 and the other event (e.g., the purchase of a communication device via a web page (e.g., online store checkout page) of the online store website at the second time) associated with the third property 414 and/or can relate to the content of the web pages accessed or interacted with by the user and/or can relate to the type of interaction with the web pages (e.g., user clicking on various buttons associated with various options relating to offers for communication devices, or clicking on buttons to view a communication device in different colors), wherein the relationship 432' can indicate that a relatively longer amount of time (e.g., 20 minutes) elapsed between the time the event(s) associated with the fourth property 416 occurred and the time the other event associated with the third property 414 occurred. This relatively longer amount of time between those events can be determined to be relatively normal and not associated with fraudulent or other undesirable behavior, such as fraudulent activity involving an unauthorized entity 122 fraudulently and illegally purchasing a communication device under the user account associated with the user (e.g., user 112) (e.g., based on a number of instances and associated embedded arrays indicating such relatively longer amount of time between those events is not associated with, correlated with, or indicative of fraudulent or other undesirable behavior).

In contrast, with regard to the first embedded array 502, the relationship 424' between third property 414 and fourth property 416 can indicate that a relatively short amount of time (e.g., less than 2 minutes) elapsed between the time the event associated with the fourth property 416 occurred and the time the other event (e.g., the purchase, or initiation of the purchase, of an expensive communication device under the user account associated with the user) associated with the third property 414 occurred. This relatively short amount of time between someone (e.g., unauthorized entity 122) first accessing and interacting with the web pages of the online store website and that someone selecting and purchasing (or initiating the purchase of) an expensive (e.g., the most expensive) communication device via a checkout web page (e.g., online store checkout page) of the online store website without that someone taking time to browse through various types of communication devices and/or various types of options for a communication device can be indicative of fraudulent activity, as that someone quickly selected and initiated the purchase of the expensive communication device without web page interactions indicating that this someone even bothered to consider other types of communication devices or available options (e.g., different colors or different memory storage sizes) for a communication device. Based at least in part on the trained neural network 610 determining that the amount of time (e.g., less than 2 minutes) between the occurrence of the event associated with the fourth property 416 and the occurrence of the other event associated with the third property 414 is relatively and abnormally short and/or determining that this someone (e.g., unauthorized entity 122) primarily only interacted with a web page offering the expensive communication device and the checkout web page to initiate purchase of the expensive communication device, the trained neural network 610 can detect, determine, identify, or infer that the relationship 424' between third property 414 and fourth property 416 is an anomaly (e.g., anomaly 544) and/or indicates fraudulent, or at least potentially fraudulent, activity associated with the user account of the user. In such case, the ADMC 126 and/or the entity 118 (e.g., representative, whether a human user or a VA, associated with the entity 118) can take a response action to prevent or mitigate the fraudulent purchase of the expensive communication device (e.g., by preventing the order for the expensive communication device from being completed) and/or can take action to prevent future fraudulent activity associated with the user account of the user and/or the someone (e.g., unauthorized entity 122) and associated communication device (e.g., 124).

Still another example can relate to churn activity by a user (e.g., user 112) associated with the user account. In this example scenario, the fourth property 416 can represent or relate to the user associated with the user account interacting with or accessing web pages of a website of an online store associated with the entity 118 at a first time, and the third property 414 can represent or relate to the user ending the user's interacting with or accessing web pages of the website at a second time. The event of interacting with or accessing web pages of the website of the online store associated with the entity 118, in and of itself (e.g., when considered in isolation), often can be a non-anomalous event.

With regard to the second embedded array 504 (which can represent a normal case that can be used to facilitate training the trained neural network 610), the relationship 432' between third property 414 and fourth property 416 can relate to the length of time between the occurrence of the event (e.g., first interacting with or accessing web pages of the online store website at the first time) associated with the fourth property 416 and the other event (e.g., the ending of the interaction with or accessing of web pages of the online store website at the second time) associated with the third property 414 and/or can relate to the content of the web pages accessed or interacted with by the user and/or can relate to the type of interaction with the web pages (e.g., user clicking on various buttons associated with various options relating to offers for products or services), wherein the relationship 432' can indicate that a relatively longer amount of time (e.g., 15 minutes) elapsed between the time the event associated with the fourth property 416 occurred and the time the other event associated with the third property 414 occurred. This relatively longer amount of time between those events can be determined to be relatively normal and not associated with undesirable behavior, such as undesirable churn behavior associated with a user (e.g., based on a number of instances and associated embedded arrays indicating such relatively longer amount of time between those events is not associated with, correlated with, or indicative of undesirable behavior).

In contrast, with regard to the first embedded array 502, the relationship 424' between third property 414 and fourth property 416 can indicate that a relatively short amount of time (e.g., less than 2 minutes) elapsed between the time the event associated with the fourth property 416 occurred and the time the other event associated with the third property 414 occurred. This relatively short amount of time between first accessing and interacting with the web pages of the online store website and ending such accessing and interacting with the web pages and/or the user (e.g., user 112) primarily only interacting with web pages presenting offers and/or showing costs associated with certain products and services can be indicative of undesirable churn activity associated with the user associated with the user account, as it can be determined that the user may be more likely to be considering ending the user's subscription with the entity 118 and starting a subscription with another entity (e.g., another entity that offers the same or similar product(s) and/or service(s)) if the user spent a relatively short amount of time (e.g., less than 2 minutes) accessing and interacting with the web pages of the online store website of the entity 118 and/or the user primarily only interacted with (e.g., viewed) web pages presenting offers and/or showing costs associated with certain products and services (e.g., the user only quickly viewed some offers and costs for a certain product(s) or service(s) on the online store website of the entity 118 and then left the website). Based at least in part on the trained neural network 610 determining that the amount of time (e.g., less than 2 minutes) between the occurrence of the event associated with the fourth property 416 and the occurrence of the other event associated with the third property 414 is relatively and abnormally short and/or determining that the user primarily only interacted with web pages presenting offers and/or showing costs associated with certain products and services, the trained neural network 610 can detect, determine, identify, or infer that the relationship 424' between third property 414 and fourth property 416 is an anomaly (e.g., anomaly 544) and/or indicates churn, or at least potential churn, activity associated with the user associated with the user account. In such case, the entity 118 (e.g., representative, whether a human user or a VA, associated with the entity 118) can or may present, or at least considering presenting, an offer for a product or service to the user (e.g., 112) to attempt to keep the user from ending the user's subscription with the entity 118.

As yet another example, the trained neural network 610 can be utilized to facilitate detecting attacks, such as distributed denial of service (DDoS) attacks, against the communication network 102 (e.g., against the network equipment 104 of the communication network 102). For instance, when communication by a communication device is desired, the communication device typically can connect to a base station and remain connected to the base station for a relatively significant amount of time, as opposed to connecting to the base station, then relatively quickly disconnecting from the base station, and, shortly thereafter, connecting again to the base station. To do such a DDoS attack, typically, there can be a relatively large number of communication devices that can be acting in an aggressive or malicious manner against the communication network 102, for instance, by connecting to a base station, quickly disconnecting from the base station, quickly connecting again to the base station, quickly disconnecting from the base station again, and so on. If, with regard to a communication device (e.g., communication device 124), based at least in part on an AI-based analysis of bits of data of an embedded array (e.g., first embedded array 502) associated with the communication device, the trained neural network 610 detects that the amount of time (e.g., the relationship 424' (e.g., the bit of data representing the relationship) in the bits of data that can relate to or indicate the amount of time) between an event associated with a property (e.g., fourth property 416) and another event associated with another property (e.g., third property 414) is relatively short (and/or such events and relationship are repeating for that communication device over relatively short amounts of time, and/or similar events and relationships are occurring with regard to a relatively large number of other communication devices based on an AI-based analysis of embedded arrays associated with those other communication devices), the trained neural network 610 can detect, determine, or infer that there can be an anomaly associated with that communication device (and/or the other communication devices) with regard to the events of connecting and disconnecting from the base station in a relatively quick manner.

With further regard to detected anomalies 616, if, based at least in part on the analysis (e.g., AI-based analysis) of the bits of data of the embedded array by the trained neural network 610, the trained neural network 610 detects, determines, identifies, infers, or predicts that there is an anomaly 616 associated with the bits of data, and accordingly, associated with the user (e.g., the user, and/or the user account and/or communication device(s) associated with the user), the trained neural network 610 can present (e.g., communicate) anomaly information relating to the anomaly 616, which can indicate the property and/or relationship between properties that are associated with the anomaly 616 (e.g., the property and/or relationship between properties that triggered the trained neural network 610 to detect the anomaly 616) and/or what is the anomalous behavior or attribute associated with the property and/or relationship between properties that caused the trained neural network 610 to detect the anomaly 616, in accordance with the defined anomaly detection criteria. The anomaly detector component 218 can receive the anomaly information relating to the anomaly 616 from the trained neural network 610. The anomaly detector component 218 can analyze and/or interpret the anomaly information relating to the anomaly 616, and, based at least in part on the results of such analysis and/or interpretation, the anomaly detector component 218 can detect, identify, or determine what the anomaly 616 is and/or relevant and/or contextual information relating to the anomaly 616. For instance, the anomaly detector component 218 can determine what event(s), interaction(s), activity (ies), and/or communication(s) is anomalous (e.g., abnormal, irregular, and/or improper) and/or why it is anomalous, whether there is fraud or potential fraud associated with the anomaly 616, what product or service is the subject of the fraud or potential fraud, identifying information (e.g., name, address, phone number, email address, SIM information, or other identifying information) associated with the anyone (e.g., unauthorized entity 122) who is associated with the anomaly 616, identifying information (e.g., device identifier, IP address, device location information, or other identifying information) associated with any communication device (e.g., communication device 124) associated with the anomaly 616, and/or other desired information relating to the anomaly 616.

The notification component 220 can generate and present (e.g., via the interface component 202) a notification message (e.g., an alarm or alert message or signal) relating to the anomaly 616. In some embodiments, the notification message can comprise information indicating that the anomaly 616 has been detected and other information relating to the anomaly 616 (e.g., information that can indicate what the anomaly 616 is and/or other relevant and/or contextual information relating to the anomaly 616). In other embodiments, the notification message can comprise an anomalous condition notification indicator that can provide a user (e.g., representative associated with the entity 118, or user associated with the user account), device (e.g., communication device 120), or component (e.g., response component 222) with notification that the anomaly 616 has been detected. The notification component 220 can communicate the notification message to the user (e.g., representative associated with the entity 118, or user associated with the user account), device (e.g., communication device 120), and/or component (e.g., response component 222).

In some embodiments, the ADMC 126 can employ the response component 222 to have the response component 222 perform (e.g., automatically or dynamically perform) a desired response action to respond to or mitigate the anomalous behavior or actions (e.g., behavior or actions of or associated with the unauthorized entity 122 and/or associated communication device 124) associated with the anomaly 616. For instance, in response to the detected anomaly 616, the response component 222 can perform a response action to block or prevent the unauthorized entity 122 and/or associated communication device 124 from making a fraudulent purchase or upgrade of a product or service (e.g., under the user account of the user (e.g., user 112), block or prevent the unauthorized entity 122 and/or associated communication device 124 from performing a fraudulent swapping of a SIM card, block or prevent the unauthorized entity 122 and/or associated communication device 124 from fraudulently adding a line (e.g., for the unauthorized entity 122 and/or an associated communication device) to a user account associated with a user (e.g., user 112), block or prevent robocalls or spam calls associated with the unauthorized entity 122 and/or associated communication device 124, block or prevent the unauthorized entity 122 and/or associated communication device 124 from successfully engaging in other fraudulent activity, initiate undoing or mitigation of harm (e.g., financial harm or costs, or other harm) resulting from fraudulent activity associated with the detected anomaly 616, and/or block, prevent, or mitigate any other undesired or improper activity associated with the detected anomaly 616.

While the ADMC 126 can create a trained neural network to detect anomalies in embedded arrays, the ADMC 126 also can create and train neural networks for other desired purposes, such as, for example, sales, marketing, and/or to determine whether certain events and/or anomalies have been overlooked (e.g., missed). For instance, the AI component 210 can train a neural network to detect, determine, identify, recognize, or infer similarities between data patterns (e.g., patterns of bits of data in embedded arrays) based at least in part on a group of embedded arrays, comprising bits of data, applied to the neural network, wherein the AI component 210 can train the neural network to facilitate steering or configuring the neural network to learn to detect, determine, identify, recognize, or infer similarities between data patterns. For example, the AI component 210 can apply embedded arrays comprising bits of data relating to respective sales and/or marketing attributes (e.g., characteristics) associated with respective users to the neural network to train the neural network to detect, determine, identify, recognize, or infer similarities between data patterns with regard to sales and/or marketing attributes to generate a trained neural network.

With a trained neural network that is trained to determine, identify, recognize, or infer similarities between data patterns with regard to sales and/or marketing attributes, the ADMC 126 can apply an embedded array, comprising bits of data, that can be associated with a user (e.g., user 112). The trained neural network can detect, determine, identify, recognize, or infer whether there are any similarities between the bits of data of the embedded array associated with the user and other data patterns associated with the trained neural network. Based at least in part on the AI-based analysis by the trained neural network, if the trained neural network does not detect any similarities, the trained neural network can indicate that no similarities were detected. If, instead, based at least in part on the AI-based analysis by the trained neural network, the trained neural network does detect, determine, identify, recognize, or infer one or more similarities in the bits of data relative to other data patterns associated with (e.g., known or recognized by) the trained neural network, the trained neural network can indicate what sales and/or marketing attributes associated with the embedded array associated with the user are recognized as being same as or similar to other sales and/or marketing attributes associated with other users and/or can indicate what products, services, offers, deals, or sales can be presented and/or what marketing techniques can be utilized (e.g., may be effective) to facilitate enticing the user to purchase a product and/or service. For example, if the AI-based analysis by the trained neural network indicates that users with similar attributes to the user have purchased or displayed an interest in purchasing a particular communication device (e.g., a particular smart phone) as compared to other types of communication devices, the trained neural network can output information that can indicate there is some similarity between this user and other users with regard to communication devices and this user likely may be interested in an offer to purchase the particular communication device.

In other embodiments, the AI component 210 can train a neural network to detect, determine, identify, recognize, or infer similarities with regard to a data pattern (e.g., bits of data of an embedded array) associated with a detected anomaly (e.g., an anomaly detected by another trained neural network, such as described herein) and other data patterns (e.g., other bits of data associated with other embedded arrays) associated with previous events and relationships to facilitate determining whether there were some anomalies relating to anomalous and/or fraudulent events, properties, or relationships that may have been overlooked. For instance, if a first trained neural network (e.g., trained neural network that is trained to detect anomalies) detects an anomaly associated with bits of data of an embedded array associated with a user, the AI component 210 can utilize a second trained neural network (e.g., trained neural network that is trained to detect similarities between data patterns) to analyze previous respective embedded arrays comprising respective bits of data, and/or its training and knowledge of previous data patterns (e.g., previous embedded arrays utilized to train the second trained neural network) to determine whether there is a previous embedded array and associated events and relationships that can contain a same or similar anomaly (e.g., anomaly associated with certain events, properties, and/or relationship(s)) as what was detected by the first trained neural network. If the second trained neural network detects, determines, identifies, recognizes, or infers that there is or are one or more previous embedded arrays and associated events and relationships that can contain a same or similar anomaly as what was detected by the first trained neural network, the second trained neural network can present information indicating that one or more previous embedded arrays and associated events and relationships that is or are same as or similar to the detected anomaly have been detected. In some embodiments, the second trained neural network can employ a k-nearest neighbor search and/or k-nearest neighbor algorithm to facilitate determining whether there are any previous embedded arrays (e.g., any previous bits of data of previous embedded arrays) that are similar enough to the bits of data of the embedded array of the detected anomaly to be identified as having anomalies. The ADMC 126 can utilize such information relating to detecting one or more anomalies relating to one or more previous embedded arrays and associated events and relationships to determine a desired response action (e.g., response or mitigation action) to take in response to detecting such one or more anomalies, such as described herein.

It is to be appreciated and understood that, while some of embodiments and aspects of the disclosed subject matter described herein relate to detection of anomalies, which can or may be fraudulent or other undesired activity, associated with user accounts of users, the disclosed subject matter is not so limited, and the disclosed subject matter can utilize the disclosed techniques relating to generating embedded arrays comprising bits of data representative of properties and relationships between properties, applying embedded arrays to a neural network to train the neural network, and using the trained neural network to detect or infer anomalies in embedded arrays analyzed by the trained neural network for virtually any desired purpose where it can be desired to detect anomalies in data, events, activities, interactions, or communications associated with people or entities.

With further regard to FIG. 2, the operations manager component 224 can control (e.g., manage) operations associated with the ADMC 126. For example, the operations manager component 224 can facilitate generating instructions to have components of the ADMC 126 perform operations, and can communicate respective instructions to respective components (e.g., interface component 202, property component 204, relationship component 206, mapper component 208, AI component 210, anomaly detector component 218, notification component 220, response component 222, processor component 226, and data store 228) of the ADMC 126 to facilitate performance of operations by the respective components of the ADMC 126 based at least in part on the instructions, in accordance with the defined anomaly detection management criteria and anomaly detection management algorithms (e.g., mapping algorithms, pattern determination or inference algorithms, anomaly detection algorithms, AI, ML, or neural network algorithms, AI-based training algorithms, predictive algorithms, clustering algorithms, or other algorithms, as disclosed, defined, recited, or indicated herein by the methods, systems, and techniques described herein). The operations manager component 224 also can facilitate controlling data flow between the respective components of the ADMC 126 and controlling data flow between the ADMC 126 and another component(s) or device(s) (e.g., a communication device, a base station or other network equipment of the communication network, resources, data sources, applications, or other type of component or device) associated with (e.g., connected to) the ADMC 126.

The processor component 226 can work in conjunction with the other components (e.g., interface component 202, property component 204, relationship component 206, mapper component 208, AI component 210, anomaly detector component 218, notification component 220, response component 222, operations manager component 224, and data store 228) to facilitate performing the various functions of the ADMC 126. The processor component 226 can employ one or more processors, microprocessors, or controllers that can process data, such as information relating to users, entities, events, interactions, activities, communications, properties, relationships between properties, embedded arrays, embedding, mapping or coding of data, communication devices, network measurements, network data traffic, applications, patterns, anomalies associated with patterns (e.g., anomalies associated with bits of data, users, entities, events, interactions, activities, communications, properties, or relationships), metadata, messages, notifications, responsive or mitigation actions, parameters, threshold values, traffic flows, policies, defined anomaly detection management criteria, algorithms (e.g., mapping algorithms, pattern determination or inference algorithms, anomaly detection algorithms, AI, ML, deep learning, or neural network algorithms, AI-based training algorithms, predictive algorithms, clustering algorithms, or other algorithms, as disclosed, defined, recited, or indicated herein by the methods, systems, and techniques described herein), protocols, interfaces, tools, and/or other information, to facilitate operation of the ADMC 126, as more fully disclosed herein, and control data flow between the ADMC 126 and other components (e.g., a communication device, a base station or other network equipment of the communication network, resources, data sources, applications, or other type of component or device) associated with the ADMC 126.

The data store 228 can store data structures (e.g., user data, metadata), code structure(s) (e.g., modules, objects, hashes, classes, procedures) or instructions, information relating to users, entities, events, interactions, activities, communications, properties, relationships between properties, embedded arrays, embedding, mapping or coding of data, communication devices, network measurements, network data traffic, applications, patterns, anomalies associated with patterns (e.g., anomalies associated with bits of data, users, entities, events, interactions, activities, communications, properties, or relationships), metadata, messages, notifications, responsive or mitigation actions, parameters, threshold values, traffic flows, policies, defined anomaly detection management criteria, algorithms (e.g., mapping algorithms, pattern determination or inference algorithms, anomaly detection algorithms, AI, ML, deep learning, or neural network algorithms, AI-based training algorithms, predictive algorithms, clustering algorithms, or other algorithms, as disclosed, defined, recited, or indicated herein by the methods, systems, and techniques described herein), protocols, interfaces, tools, and/or other information, to facilitate controlling operations associated with the ADMC 126. In an aspect, the processor component 226 can be functionally coupled (e.g., through a memory bus) to the data store 228 in order to store and retrieve information desired to operate and/or confer functionality, at least in part, to the interface component 202, property component 204, relationship component 206, mapper component 208, AI component 210, anomaly detector component 218, notification component 220, response component 222, operations manager component 224, processor component 226, data store 228, and/or other component, and/or substantially any other operational aspects of the ADMC 126.

With further regard to the AI component 210, the AI component 210 can perform an AI and/or ML analysis on data, such as data associated with users (e.g., data associated with user accounts of users), data associated with events, interactions, activities, or communications associated with users or entities, network measurement data, network-related data, communication device-related data, external data, and/or other desired data, such as more fully described herein. In connection with or as part of such an AI or ML analysis, the AI component 210 can employ, apply, build (e.g., construct or create), and/or import, AI, ML, and/or deep learning techniques and algorithms, AI, ML, and/or deep learning models (e.g., trained models), neural networks (e.g., trained neural networks), and/or graph mining to render and/or generate predictions, inferences, calculations, prognostications, estimates, derivations, forecasts, detections, and/or computations that can facilitate training neural networks to enable trained neural networks to desirably (e.g., accurately, quickly, efficiently, enhancedly, and/or optimally) detect anomalies (e.g., fraudulent activity or other undesired anomalous activity) in embedded arrays (e.g., anomalies in bits of data in embedded arrays) relating to events, interactions, activities, and/or communications associated with users or entities, training neural networks to enable trained neural networks to desirably detect similarities in patterns of data relating to events, interactions, activities, and/or communications associated with users or entities, and/or automating one or more functions or features of the disclosed subject matter.

The AI component 210 can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 210 can examine the entirety or a subset of the data (e.g., data associated with users, data associated with events, interactions, activities, or communications associated with users or entities, network measurement data, network-related data, communication device-related data, external data, and/or other desired data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, ..., zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, B ayesian networks, decision trees, neural networks, fuzzy logic models, and/or probabilistic classification models providing different patterns of independence, any of which can be employed. Classification as used herein also is inclusive of statistical regression that is utilized to develop models of priority.

The systems and/or devices, including the aforementioned systems and/or devices, described herein have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
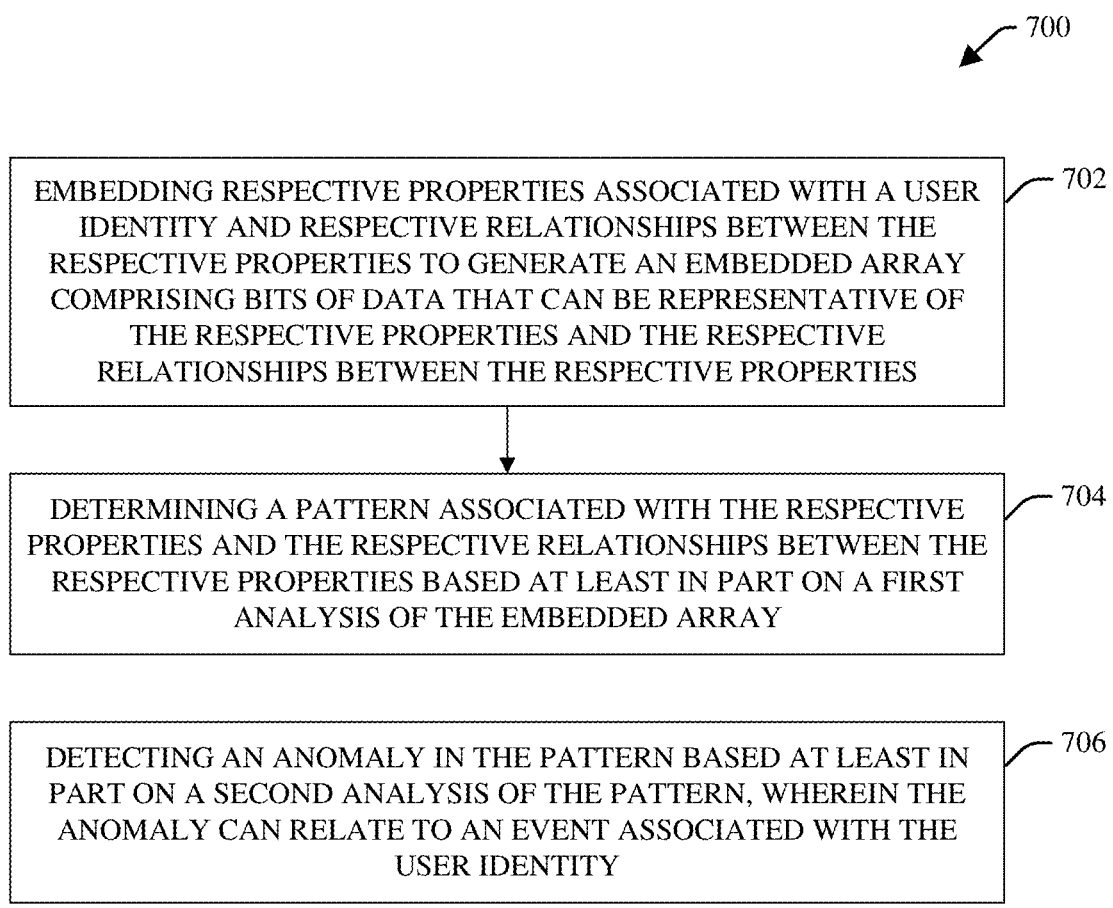
FIG. 7 illustrates a flow chart of an example method that can desirably detect anomalies relating to events and associated with users (e.g., associated with user accounts or communication devices associated with users), in accordance with various aspects and embodiments of the disclosed subject matter.
Figure 8:
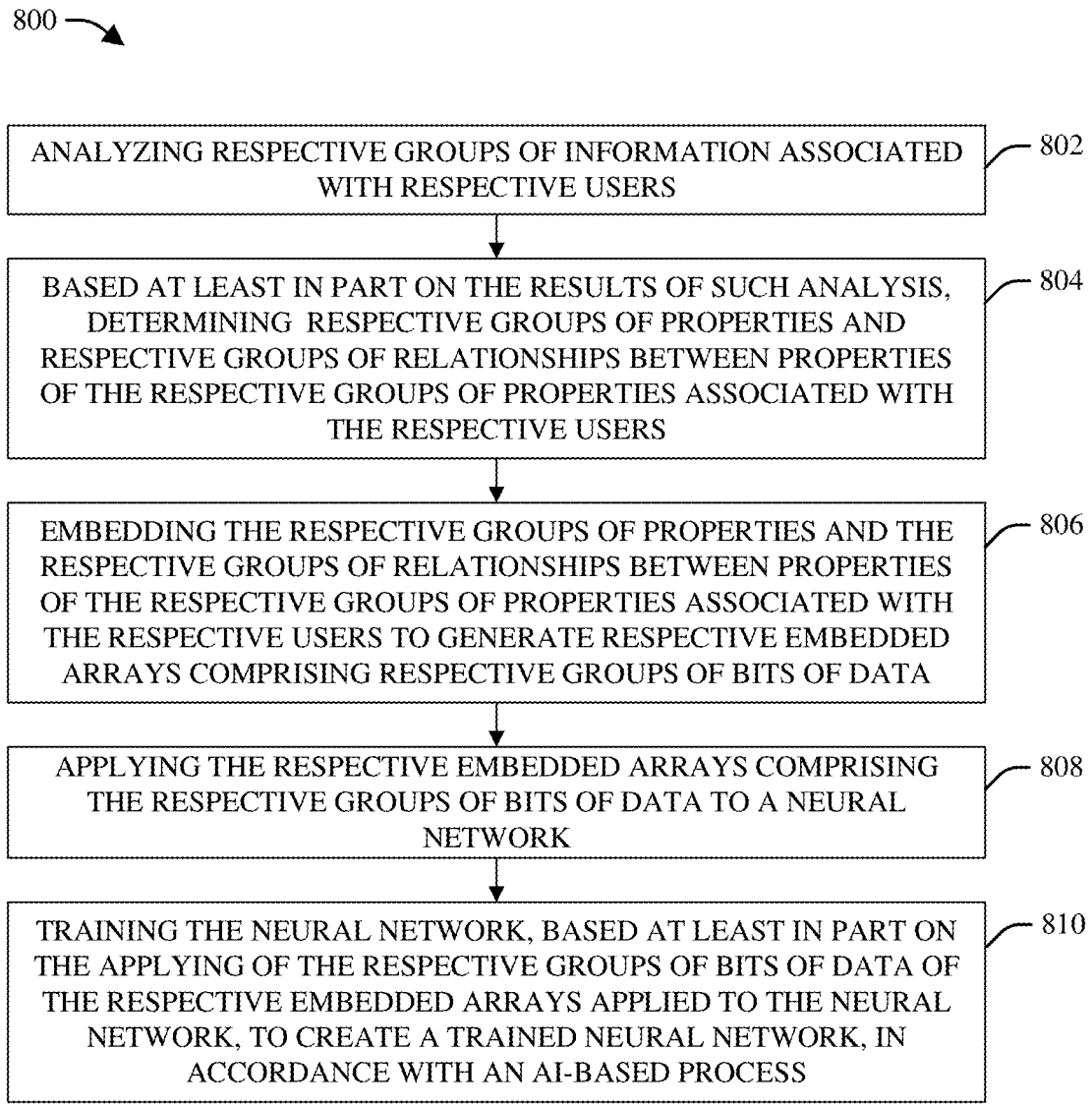
FIG. 8 depicts a flow chart of an example method that can desirably train a neural network that can be utilized to detect anomalies relating to events and associated with users (e.g., associated with user accounts or communication devices associated with users), in accordance with various aspects and embodiments of the disclosed subject matter.
Figure 9:
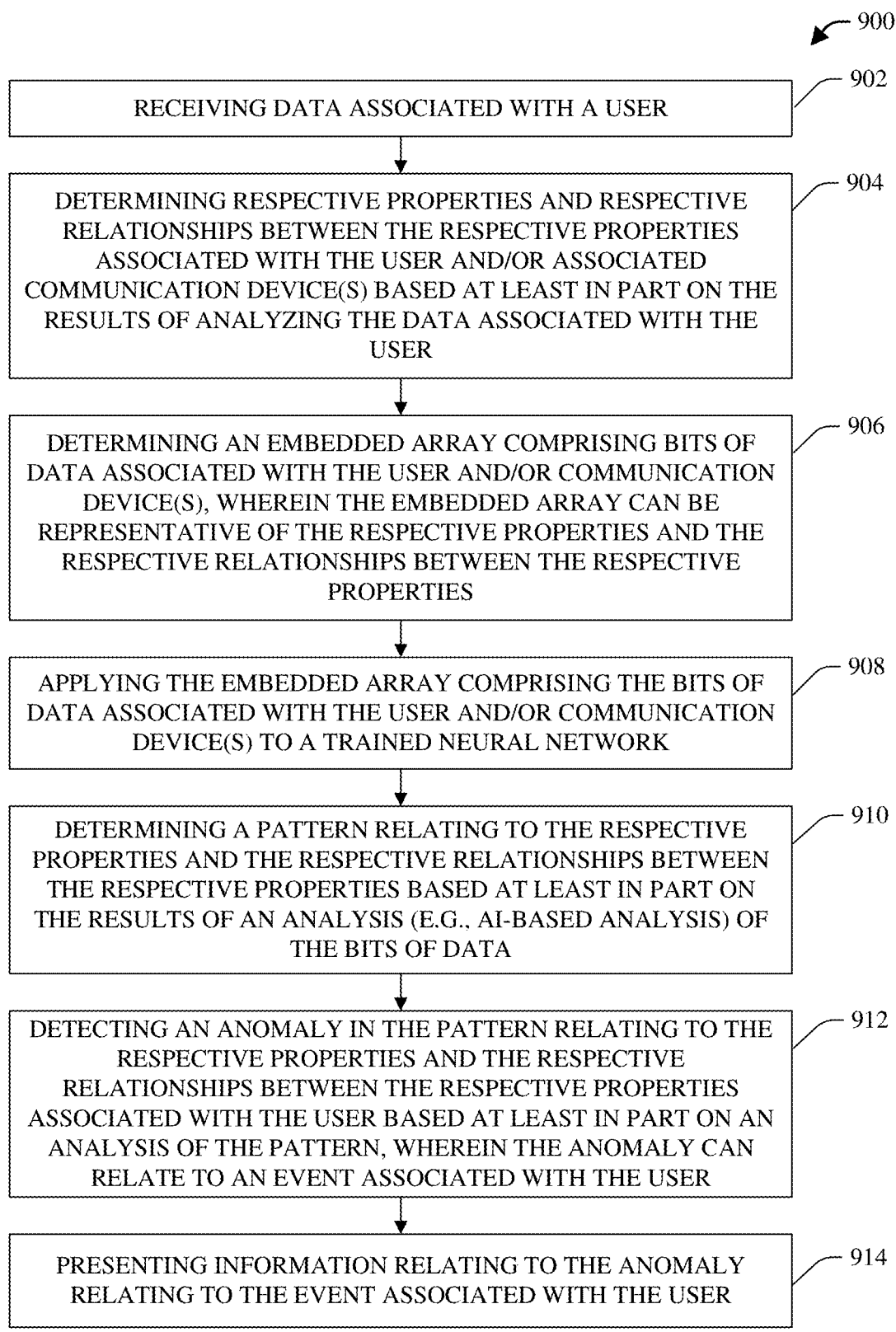
FIG. 9 depicts a flow chart of another example method that can desirably detect anomalies relating to events and associated with users (e.g., associated with user accounts or communication devices associated with users), in accordance with various aspects and embodiments of the disclosed subject matter.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 that can desirably detect anomalies relating to events and associated with users (e.g., associated with user accounts or communication devices associated with users), in accordance with various aspects and embodiments of the disclosed subject matter. The method 700 can be employed by, for example, a system comprising the ADMC, a processor component (e.g., of or associated with the ADMC), and/or a data store (e.g., of or associated with the ADMC).

At 702, respective properties associated with a user identity and respective relationships between the respective properties can be embedded to generate an embedded array comprising bits of data that can be representative of the respective properties and the respective relationships between the respective properties. The ADMC can analyze information associated with the user identity (e.g., information, such as records, associated with an account associated with the user associated with the user identity). The information can relate to events, activities, interactions, communications, or a device(s) associated with the user identity (e.g., associated with the account associated with the user), wherein the events, activities, interactions, or communications can be ones that have occurred over a desired period of time. Based at least in part on the analysis results, the ADMC can determine the respective properties and the respective relationships between the respective properties. The respective relationships determined by the ADMC can comprise temporal, spatial, and/or other contextual features of such relationships between the respective properties, such as described herein. The ADMC can embed the respective properties and the respective relationships between the respective properties to generate an embedded array comprising the bits of data that can be representative of the respective properties and the respective relationships between the respective properties.

At 704, a pattern associated with the respective properties and the respective relationships between the respective properties can be determined based at least in part on a first analysis of the embedded array. The ADMC can train a neural network, based at least in part on applying respective embedded arrays comprising respective groups of bits of data to the neural network, to create (e.g., generate) a trained neural network. The ADMC can determine the respective groups of bits of data of the respective embedded arrays based at least in part on the results of analyzing respective information (e.g., respective records or other information) associated with respective users, and, based at least in part on such analysis results, determining respective groups of properties and respective groups of relationships between properties of the respective groups of properties associated with the respective users. The trained neural network can determine or infer the pattern associated with the respective properties and the respective relationships between the respective properties based at least in part on the first analysis (e.g., first AI-based analysis) of the embedded array.

At 706, an anomaly in the pattern can be detected based at least in part on a second analysis of the pattern, wherein the anomaly can relate to an event associated with the user identity. The ADMC, employing the trained neural network, can detect, determine, identify, or infer the anomaly in the pattern associated with the respective properties and the respective relationships between the respective properties based at least in part on a second analysis (e.g., second AI-based analysis) of the pattern, wherein the anomaly can relate to an event, interaction, activity, and/or communication associated with the user identity (e.g., an event associated with the user account of the user associated with the user identity).

For instance, the trained neural network can be trained to discriminate between the embedded array (e.g., the bits of data of the embedded array and/or the pattern representative of the bits of data) and the respective embedded arrays (e.g., the respective groups of bits of data of the respective embedded arrays and/or the respective patterns representative of the respective groups of bits of data) utilized to train the neural network. Based at least in part on the results of analyzing the bits of data of the embedded array applied to the trained neural network, the trained neural network can detect, determine, identify, or infer the anomaly (e.g., the difference(s)) in the pattern associated with the embedded array relative to the respective patterns associated with the respective embedded arrays. The anomaly can relate to, for example, fraudulent activity (e.g., by an unauthorized, malicious, and/or fraudulent entity), churn activity (e.g., by the user associated with the user account), robocall or spam call activity (e.g., by an unauthorized, malicious, and/or fraudulent entity), and/or other activity (e.g., other undesirable activity).

FIG. 8 depicts a flow chart of an example method 800 that can desirably train a neural network that can be utilized to detect anomalies relating to events and associated with users (e.g., associated with user accounts or communication devices associated with users), in accordance with various aspects and embodiments of the disclosed subject matter. The method 800 can be employed by, for example, a system comprising the ADMC, a processor component (e.g., of or associated with the ADMC), and/or a data store (e.g., of or associated with the ADMC).

At 802, respective groups of information associated with respective users can be analyzed. The ADMC can receive the respective groups of information associated with the respective users and their respective communication devices from various data sources, including the communication network, the respective user accounts associated with the respective users and/or respective communication devices, stores (e.g., online stores or brick and mortar stores that sell products (e.g., communication devices and/or other products) and services (e.g., communications-related services)), websites (e.g., websites of online stores), social networks, and/or other desired data sources. The ADMC can analyze the respective groups of information associated with the respective users. The respective groups of information can relate to, for example, respective events, activities, interactions, communications, or a device(s) associated with the respective users, wherein the respective events, activities, interactions, or communications can be ones that have occurred over a desired period(s) of time.

At 804, based at least in part on the results of such analysis, respective groups of properties and respective groups of relationships between properties of the respective groups of properties associated with the respective users can be determined. The ADMC can determine the respective groups of properties and the respective groups of relationships between properties of the respective groups of properties associated with the respective users based at least in part on such analysis results.

At 806, the respective groups of properties and the respective groups of relationships between properties of the respective groups of properties associated with the respective users can be embedded to generate respective embedded arrays comprising respective groups of bits of data. Based at least in part on such analysis results, the ADMC can embed (e.g., embed, map, and/or code) the respective groups of properties and the respective groups of relationships to generate (e.g., create or form) the respective embedded arrays comprising the respective groups of bits of data. With regard to each of the respective groups of bits of data, a group of bits of data can be representative of the respective properties and the respective relationships between properties associated with a user, such as described herein.

At 808, the respective embedded arrays comprising the respective groups of bits of data can be applied to a neural network. At 810, the neural network can be trained, based at least in part on the applying of the respective groups of bits of data of the respective embedded arrays applied to the neural network, to create a trained neural network, in accordance with an AI-based process. The ADMC can apply (e.g., input) the respective embedded arrays comprising the respective groups of bits of data to the neural network to facilitate training the neural network. Based at least in part on the applying of the respective groups of bits of data to the neural network, the ADMC, employing the AI component, can desirably train the neural network to create (e.g., form or generate) the trained neural network, in accordance with the AI-based process and/or associated AI-based algorithms and techniques. As part of the training of the trained neural network and/or analysis of the respective groups of bits of data performed by the trained neural network during the training of the trained neural network, the trained neural network can determine, identify, or infer respective patterns associated with the respective embedded arrays. The ADMC can utilize the trained neural network to facilitate detecting, determining, identifying, or inferring anomalies (e.g., abnormalities, irregularities) associated with bits of data associated with properties and relationships between properties associated with a user (e.g., an account associated with the user), such as more fully described herein. An anomaly can relate to, for example, fraudulent activity, churn activity, robocall activity, spam activity, and/or other activity (e.g., other undesirable activity).

FIG. 9 depicts a flow chart of another example method 900 that can desirably detect anomalies relating to events and associated with users (e.g., associated with user accounts or communication devices associated with users), in accordance with various aspects and embodiments of the disclosed subject matter. The method 900 can be employed by, for example, a system comprising the ADMC, a processor component (e.g., of or associated with the ADMC), and/or a data store (e.g., of or associated with the ADMC).

At 902, data associated with a user can be received. The ADMC can receive or obtain the data associated with the user and/or associated communication device(s) from one or more of various data sources. The ADMC can receive the data associated with the user and/or associated communication device(s) from various data sources, including, for example, the communication network, a user account associated with the user and/or the communication device(s), stores (e.g., online stores or brick and mortar stores that sell products (e.g., communication devices and/or other products) and services (e.g., communications-related services)), websites (e.g., websites of online stores), social networks, and/or other desired data sources. The data associated with the user can relate to, for example, events, activities, interactions, communications, or the communication device(s) associated with the respective users, wherein the events, activities, interactions, or communications can be ones that have occurred over a desired period(s) of time.

At 904, respective properties and respective relationships between the respective properties associated with the user and/or associated communication device(s) can be determined based at least in part on the results of analyzing the data associated with the user. The ADMC can analyze the data associated with the user and/or associated communication device. The ADMC can determine or identify the respective properties and the respective relationships between the respective properties associated with the user and/or associated communication device(s) based at least in part on the results of analyzing the data associated with the user.

At 906, an embedded array comprising bits of data associated with the user and/or communication device(s) can be determined, wherein the embedded array can be representative of the respective properties and the respective relationships between the respective properties. The ADMC can determine and generate the embedded array comprising the bits of data that can be representative of the respective properties and the respective relationships between the respective properties, such as more fully described herein.

At 908, the embedded array comprising the bits of data associated with the user and/or communication device(s) can be applied to a trained neural network. The ADMC can apply (e.g., input) the embedded array comprising the bits of data to the trained neural network, wherein the trained neural network can be trained to detect or determine anomalies (e.g., anomalies in data patterns) relating to properties, events, interactions, or activities associated with users, associated communication devices, and/or associated user accounts.

At 910, a pattern relating to the respective properties and the respective relationships between the respective properties can be determined based at least in part on the results of an analysis (e.g., AI-based analysis) of the bits of data. The trained neural network can perform an AI-based analysis (e.g., neural network analysis) on the bits of data of the embedded array, in accordance with an AI-based analysis process and/or AI-based algorithms and techniques. Based at least in part on the results of such AI-based analysis of the bits of data of the embedded array, the trained neural network can determine the pattern relating to (e.g., representative of or corresponding to) the respective properties and the respective relationships between the respective properties.

At 912, an anomaly can be detected in the pattern relating to the respective properties and the respective relationships between the respective properties associated with the user based at least in part on an analysis of the pattern, wherein the anomaly can relate to an event associated with the user. The trained neural network can be trained based at least in part on applying respective groups of bits of data of respective embedded arrays relating to respective groups of properties and respective groups of relationships between properties associated with respective users and respective communication devices, such as described herein. As part of the training, the trained neural network also can determine, identify, and/or recognize respective patterns relating to the respective groups of properties and the respective groups of relationships between properties associated with the respective users and the respective communication devices, such as described herein.

The trained neural network can perform an AI-based analysis (e.g., neural network analysis) on the pattern relating to the respective properties and the respective relationships between the respective properties associated with the user. Based at least in part on the results of the AI-based analysis of the pattern relating to the respective properties and the respective relationships between the respective properties associated with the user, the trained neural network can determine, identify, or infer the anomaly in the pattern, wherein the anomaly can relate to the event associated with the user (e.g., an event relating to a user account and/or communication device associated with the user). For instance, based at least in part on the results of the AI-based analysis of the pattern associated with the user and other patterns associated with other users, the trained neural network can determine, identify, or infer the anomaly in the pattern associated with the user relative to the other patterns associated with the other users.

At 914, information relating to the anomaly relating to the event associated with the user can be presented. The ADMC can present (e.g., communicate or display) the information relating to the anomaly relating to the event associated with the user to an entity (e.g., a representative associated with the entity that provides products and services associated with the user account of the user) and/or the user to notify the entity and/or the user if the detected anomaly relating to the event and associated with the user (e.g., associated with the user account of the user). In some instances (e.g., when appropriate), the entity (e.g., representative associated with the entity) can perform a desired action (e.g., responsive or mitigation action) in response to the detected anomaly. As an example, if the detected anomaly relates to an attempt, or an apparent attempt, by an unauthorized entity (e.g., a malicious entity, fraudster, or criminal) to fraudulently obtain a new communication device (e.g., a new or upgraded smart phone) under the user account associated with the user (e.g., having the user account charged for the new communication device), the representative can block or deny (or the ADMC can automatically block or deny) the attempt by the unauthorized entity to purchase the new communication device under the user account associated with the user.

Figure 10:
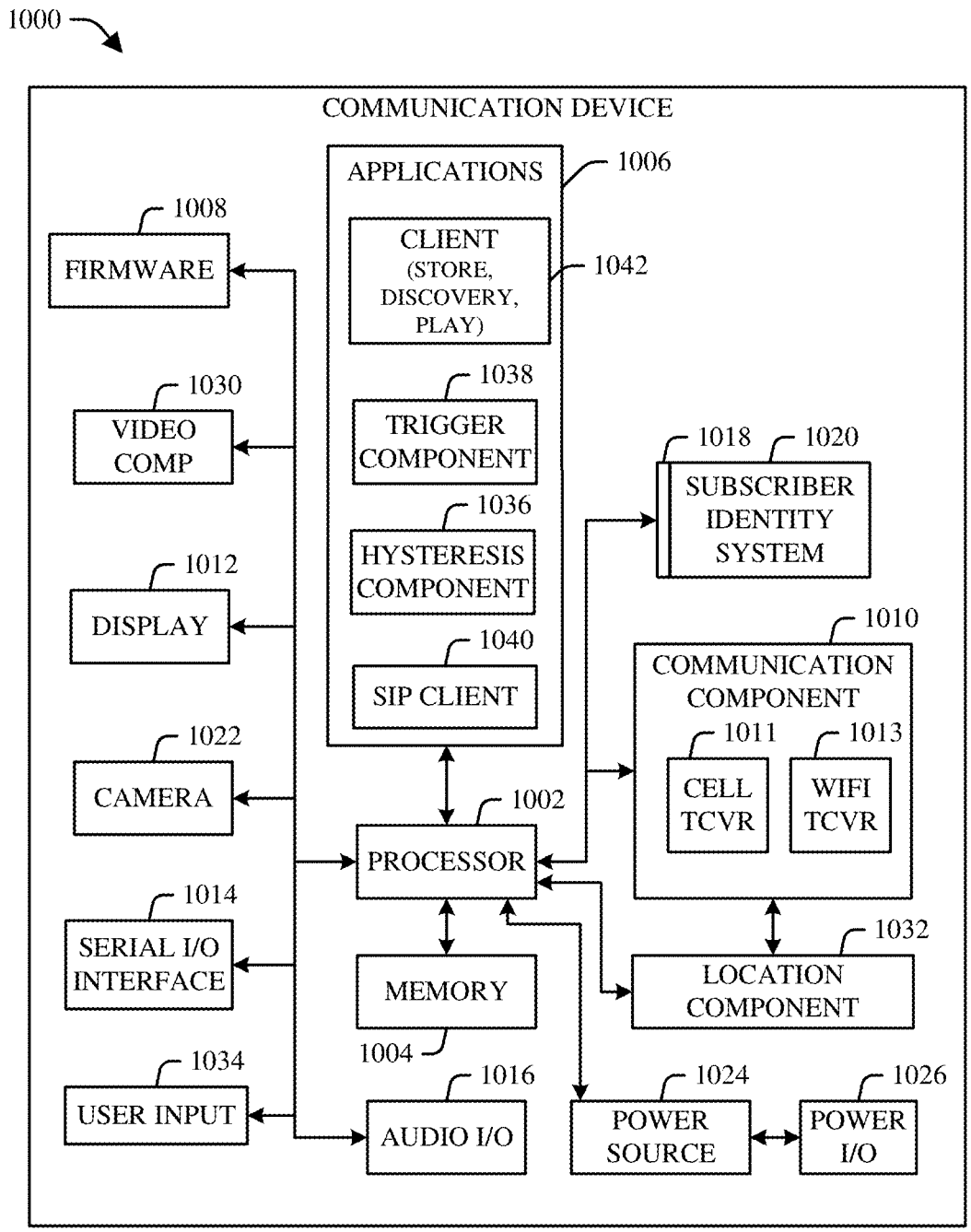
FIG. 10 depicts a block diagram of example communication device, in accordance with various aspects and embodiments of the disclosed subject matter.

Referring now to FIG. 10, depicted is an example block diagram of an example communication device 1000 (e.g., wireless or mobile phone, electronic pad or tablet, electronic eyewear, electronic watch, or other electronic bodywear, IoT device, or other type of communication device) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 1000 can include a processor 1002 for controlling and processing all onboard operations and functions. A memory 1004 interfaces to the processor 1002 for storage of data and one or more applications 1006 (e.g., a video player software, user feedback component software, or other type of application). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the communication device 1000. A communication component 1010 interfaces to the processor 1002 to facilitate wired/wireless communication with external systems, e.g., cellular networks, VoIP networks, and so on. Here, the communication component 1010 can also include a suitable cellular transceiver 1011 (e.g., a GSM transceiver) and/or an unlicensed transceiver 1013 (e.g., Wi-Fi, WiMax) for corresponding signal communications. The communication device 1000 can be a device such as a cellular telephone, a PDA with mobile communications capabilities, and messaging-centric devices. The communication component 1010 also facilitates communications reception from terrestrial radio networks (e.g., broadcast), digital satellite radio networks, and Internet-based radio services networks.

The communication device 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, or other content). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The communication device 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the communication device 1000, and updated by downloading data and software.

The communication device 1000 can process IP data traffic through the communication component 1010 to accommodate IP traffic from an IP network such as, for example, the Internet, a corporate intranet, a home network, a person area network, or other network, through an ISP or broadband cable provider. Thus, VoIP traffic can be utilized by the communication device 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The communication device 1000 also includes a power source 1024 in the form of batteries and/or an AC power subsystem, which power source 1024 can interface to an external power system or charging equipment (not shown) by a power I/O component 1026.

The communication device 1000 can also include a video component 1030 for processing video content received and, for recording and transmitting video content. For example, the video component 1030 can facilitate the generation, editing and sharing of video quotes. A location tracking component 1032 facilitates geographically locating the communication device 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the communication device 1000 to support SIP protocols and register the subscriber with the SIP registrar server. The applications 1006 can also include a client 1042 that provides at least the capability of discovery, play and store of multimedia content, for example, music.

The communication device 1000, as indicated above related to the communication component 1010, includes an indoor network radio transceiver 1013 (e.g., Wi-Fi transceiver). This function supports the indoor radio link, such as IEEE 802.11, for the dual-mode GSM device (e.g., communication device 1000). The communication device 1000 can accommodate at least satellite radio services through a device (e.g., handset device) that can combine wireless voice and digital radio chipsets into a single device (e.g., single handheld device).

Figure 11:
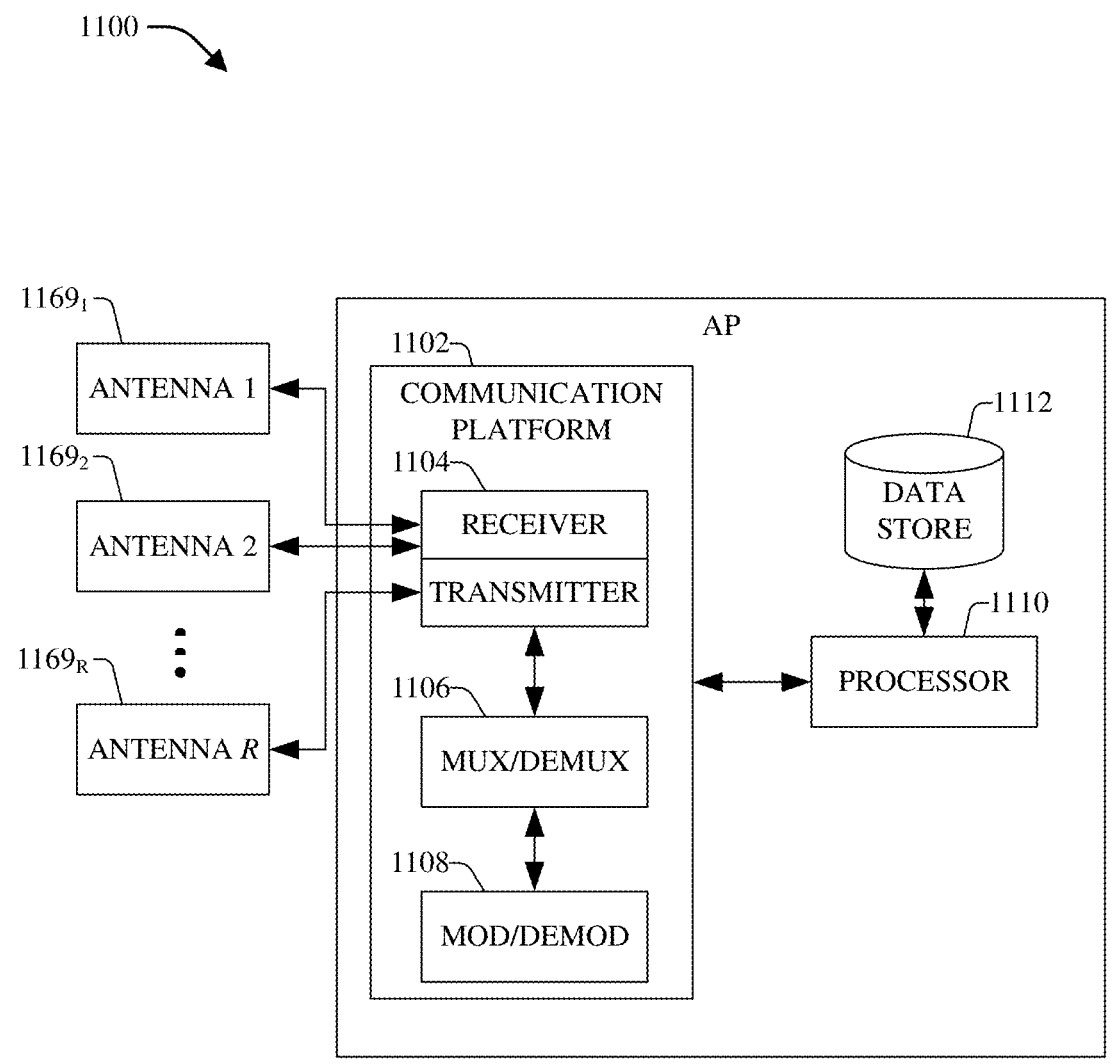
FIG. 11 illustrates a block diagram of an example access point, in accordance with various aspects and embodiments of the disclosed subject matter.

FIG. 11 illustrates a block diagram of an example AP 1100 (e.g., macro base station, femto AP, pico AP, Wi-Fi AP, Wi-Fi-direct AP, or other type of AP), in accordance with various aspects and embodiments of the disclosed subject matter. The AP 1100 can receive and transmit signal(s) from and to wireless devices like access points (e.g., base stations, femtocells, picocells, or other type of access point), access terminals (e.g., UEs), wireless ports and routers, and the like, through a set of antennas $1169_1$-$1169_R$. In an aspect, the antennas $1169_1$-$1169_R$ are a part of a communication platform 1102, which comprises electronic components and associated circuitry that can provide for processing and manipulation of received signal(s) and signal(s) to be transmitted. In an aspect, the communication platform 1102 can include a receiver/transmitter 1104 that can convert signal from analog to digital upon reception, and from digital to analog upon transmission. In addition, receiver/transmitter 1104 can divide a single data stream into multiple, parallel data streams, or perform the reciprocal operation.

In an aspect, coupled to receiver/transmitter 1104 can be a multiplexer/demultiplexer (mux/demux) 1106 that can facilitate manipulation of signal in time and frequency space. The mux/demux 1106 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 1106 can scramble and spread information (e.g., codes) according to substantially any code known in the art, e.g., Hadamard-Walsh codes, Baker codes, Kasami codes, polyphase codes, and so on. A modulator/demodulator (mod/demod) 1108 also can be part of the communication platform 1102, and can modulate information according to multiple modulation techniques, such as frequency modulation, amplitude modulation (e.g., M-ary quadrature amplitude modulation (QAM), with M a positive integer), phase-shift keying (PSK), and the like.

The AP 1100 also can comprise a processor(s) 1110 that can be configured to confer and/or facilitate providing functionality, at least partially, to substantially any electronic component in or associated with the AP 1100. For instance, the processor(s) 1110 can facilitate performance of operations on data (e.g., symbols, bits, or chips) for multiplexing/demultiplexing, modulation/demodulation, such as effecting direct and inverse fast Fourier transforms, selection of modulation rates, selection of data packet formats, inter-packet times, or other operations on data.

In another aspect, the AP 1100 can include a data store 1112 that can store data structures; code instructions; rate coding information; information relating to measurement of radio link quality or reception of information related thereto; information relating to communication conditions (e.g., SINR, implicit NACK rate, RSRP, RSRQ, CQI, and/or other wireless communications metrics or parameters) associated with communication devices, parameter data, threshold values associated with parameters, ACK/NACK-related information (e.g., ACK/NACK status information), time-related information, metadata, communication devices, policies and rules, users, applications, services, communication management criteria, traffic flows, signaling, algorithms (e.g., communication management algorithm(s), mapping algorithm (s), or other algorithm), protocols, interfaces, tools, and/or other information, etc.; white list information, information relating to managing or maintaining the white list; system or device information like policies and specifications; code sequences for scrambling; spreading and pilot transmission; floor plan configuration; access point deployment and frequency plans; scheduling policies; and so on. The processor (s) 1110 can be coupled to the data store 1112 in order to store and retrieve information (e.g., information, such as algorithms, relating to multiplexing/demultiplexing or modulation/demodulation; information relating to radio link levels; information relating to communication conditions (e.g., SINR, implicit NACK rate, RSRP, RSRQ, CQI, and/or other wireless communications metrics or parameters) associated with communication devices, parameter data, threshold values associated with the parameters, ACK/NACK-related information (e.g., ACK/NACK status information), time-related information, metadata, communication devices, policies and rules, users, applications, services, communication management criteria, traffic flows, signaling, algorithms (e.g., communication management algorithm(s), mapping algorithm(s), or other algorithm), protocols, interfaces, tools, and/or other information) desired to operate and/or confer functionality to the communication platform 1102 and/or other operational components of AP 1100.

Figure 12:
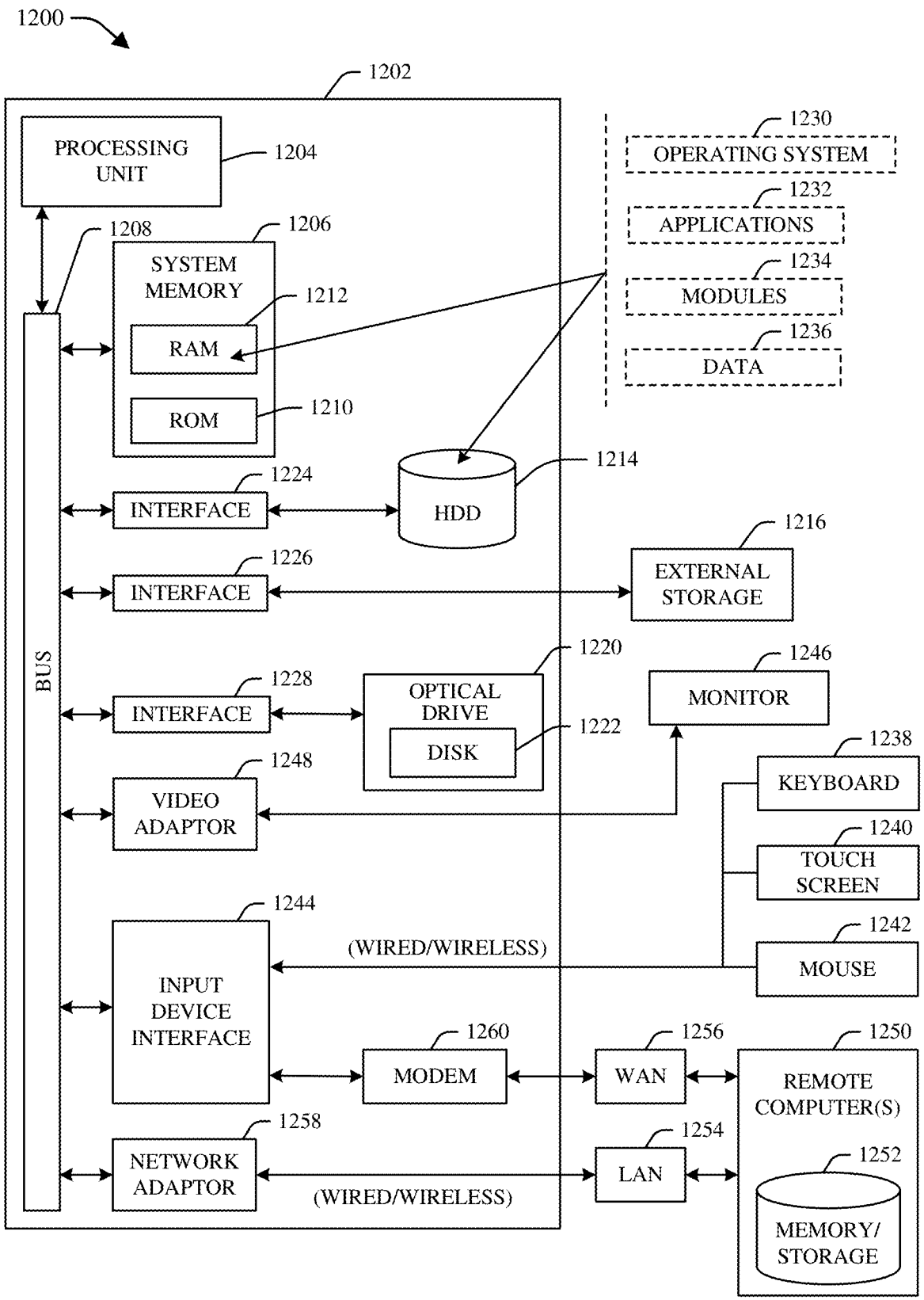
FIG. 12 is a schematic block diagram illustrating a suitable computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, or other type of storage device) and an optical disk drive 1220 (e.g., which can read or write from a CD-ROM disc, a DVD, a BD, or other disk drive). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH' interface, or other type of interface.

A monitor 1246 or other type of display device can be also connected to the system bus 1208 via an interface, such as a video adapter 1248. In addition to the monitor 1246, a computer typically includes other peripheral output devices (not shown), such as speakers, printers, or other type of peripheral output device.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/ wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/ storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256, e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, or other equipment or entity), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, or other alphanumeric character) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); or other type of wireless telecommunication or radio technology. Additionally, some or all of the aspects described herein can be exploited in legacy telecommunication technologies, e.g., GSM. In addition, mobile as well non-mobile networks (e.g., the internet, data service network such as internet protocol television (IPTV), or other network) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, or other type of magnetic storage device), optical discs (e.g., compact disc (CD), digital versatile disc (DVD), blu-ray disc (BD), or other type of optical disc), smart cards, and memory devices comprising volatile memory and/or nonvolatile memory (e.g., flash memory devices, such as, for example, card, stick, key drive, or other type of memory device), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication network, network equipment, anomaly detection management component (ADMC), communication device, AI component, neural network, trained neural network, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   embedding, by a system comprising a processor, respective properties associated with a user identity of a first user and respective relationships between the respective properties to generate an embedded array comprising bits of data representative of the respective properties and the respective relationships between the respective properties, wherein each cell of a plurality of cells in the embedded array is for representing one of the respective properties or one of the respective relationships, wherein a first cell of the plurality of cells has a first position in the embedded array that is reserved to refer to a first property of the respective properties, wherein a second cell of the plurality of cells has a second position in the embedded array that is reserved to refer to a second property of the respective properties, and wherein a third cell of the plurality of cells has a third position in the embedded array that is reserved to refer to a first relationship between the first property and the second property, wherein the first relationship comprises a spatial relationship, and wherein a value in the third cell is associated with a measure of the spatial relationship;
   determining, by the system, a pattern associated with the respective properties and the respective relationships between the respective properties based on a first analysis of the embedded array; and
   detecting, by the system, an anomaly in the pattern based on a second analysis of the pattern, wherein the anomaly relates to an event associated with the user identity, and wherein the second analysis is performed by a trained model that was trained on respective embedded arrays associated with other users that do not include the first user.

2. The method of claim 1, wherein a first amount of data, relating to the respective properties and the respective relationships and that is utilized to embed the respective properties and the respective relationships to generate the embedded array, is greater than a second amount of data contained in the bits of data.

3. The method of claim 1, further comprising:
   applying, by the system, the respective embedded arrays associated with the other users comprising respective groups of bits of data to a neural network, wherein the respective groups of bits of data are representative of respective groups of properties and respective groups of relationships between properties of the respective groups of properties; and training, by the system, the neural network, based on the respective groups of bits of data applied to the neural network, to create a trained neural network, wherein the trained model is the trained neural network.

4. The method of claim 3, wherein the training of the neural network comprises performing an artificial intelligence-based analysis on the respective embedded arrays, in accordance with an artificial intelligence-based process.

5. The method of claim 3, further comprising:
applying, by the system, the bits of data of the embedded array to the trained neural network,
wherein the determining of the pattern comprises determining, by the trained neural network of the system, the pattern associated with the respective properties and the respective relationships between the respective properties based on the applying of the bits of data of the embedded array to the trained neural network,
wherein the detecting of the anomaly comprises detecting, by the trained neural network of the system, the anomaly in the pattern based on comparing the pattern associated with the embedded array to other patterns associated with the respective embedded arrays, and
wherein the second analysis comprises the comparing.

6. The method of claim 3, wherein the event is a second event, wherein the respective properties comprise the first property associated with a first event and the second property associated with the second event, wherein the respective relationships comprise the first relationship between the first property and the second property, wherein the bits of data of the embedded array comprise a first bit of data associated with the first property, a second bit of data associated with the second property, and a third bit of data associated with the first relationship, and wherein the first bit of data, the second bit of data, and the third bit of data are arranged in respective cells of the plurality of cells and in a structured order in relation to each other in the embedded array based on the first property, the first event, the second property, the second event, or the first relationship.

7. The method of claim 6, further comprising:
as part of the second analysis:
determining, by the trained neural network of the system, that the first property, individually, is not anomalous based on the first bit;
determining, by the trained neural network of the system, that the second property, individually, is not anomalous based on the second bit; and
determining, by the trained neural network of the system, that the first relationship between the first property and the second property is the anomaly based on the first bit, the second bit, or the third bit.

8. The method of claim 6, further comprising:
as part of the second analysis:
determining, by the trained neural network of the system, that the anomaly in the pattern relates to the first property based on the first bit or relates to the second property based on the second bit.

9. The method of claim 6, wherein the first relationship between the first property and the second property relates a first location associated with the first event in relation to a second location associated with the second event, or a first activity associated with the first event in relation to a second activity associated with the second event.

10. The method of claim 1, wherein a bit of data of the bits of data contains a Boolean value, an integer value, a floating point number, a complex value, a shape, an indicator, or an alphanumeric value.

11. The method of claim 1, wherein the anomaly relates to a fraudulent activity, a churn activity, a robocall activity, or a spam activity.

12. The method of claim 1, further comprising:
compressing, by the system, the embedded array to reduce an amount of storage space utilized by the bits of data of the embedded array.

13. A system, comprising:
a processor; and
a memory that stores executable instructions that, when executed by the processor, facilitate performance of operations, the operations comprising:
mapping respective attributes associated with an entity identity of a first user and respective relationships between the respective attributes to generate an embedded array comprising bits of data representative of the respective attributes and the respective relationships between the respective attributes, wherein each cell of a plurality of cells in the embedded array is for representing one of the respective attributes or one of the respective relationships, wherein a first cell of the plurality of cells has a first position in the embedded array that is reserved to refer to a first attribute of the respective attributes, wherein a second cell of the plurality of cells has a second position in the embedded array that is reserved to refer to a second attribute of the respective attributes, and wherein a third cell of the plurality of cells has a third position in the embedded array that is reserved to refer to a first relationship between the first attribute and the second attribute, wherein the first relationship comprises a spatial relationship, and wherein a value in the third cell is associated with a measure of the spatial relationship;
determining a pattern associated with the respective attributes and the respective relationships between the respective attributes based on a first analysis of the embedded array; and
determining an anomaly in the pattern based on a second analysis of the pattern, wherein the anomaly relates to an event associated with the entity identity, and wherein the second analysis is performed by a trained model that was trained on respective embedded arrays associated with other users that do not include the first user.

14. The system of claim 13, wherein a first amount of information relating to the respective attributes and the respective relationships that is utilized to embed the respective attributes and the respective relationships to generate the embedded array is greater than a second amount of information contained in the bits of data, and wherein a bit of data of the bits of data contains a Boolean value, an integer value, a floating point number, a complex value, a shape, an indicator, or an alphanumeric value.

15. The system of claim 13, wherein the operations further comprise:
inputting the respective embedded arrays of the other users comprising respective groups of bits of data to a neural network, wherein the respective groups of bits of data are representative of respective groups of attributes and respective groups of relationships between attributes of the respective groups of attributes; and training the neural network, based on the respective groups of bits of data input to the neural network, to generate a trained neural network, wherein the trained model is the trained neural network.

16. The system of claim 15, wherein the operations further comprise:
performing an artificial intelligence-based analysis on the respective embedded arrays, in accordance with an artificial intelligence-based process, to facilitate the training of the neural network.

17. The system of claim 15, wherein the operations further comprise:
inputting the bits of data of the embedded array to the trained neural network,
wherein the determining of the pattern comprises determining, by the trained neural network, the pattern associated with the respective attributes and the respective relationships between the respective attributes based on the inputting of the bits of data of the embedded array to the trained neural network,
wherein the determining of the anomaly comprises determining, by the trained neural network, the anomaly in the pattern based on a comparison of the pattern associated with the embedded array to other patterns associated with the respective embedded arrays, and wherein the second analysis comprises the comparison.

18. The system of claim 13, wherein the anomaly relates to a fraudulent activity, a churn activity, a robocall activity, or a spam activity.

19. A non-transitory machine-readable medium, comprising executable instructions that, when executed by a processor, facilitate performance of operations, the operations comprising:
coding respective characteristics associated with an entity identity of a first user and respective relationships between the characteristics to generate an embedded array comprising bits of information representative of the respective characteristics and the respective relationships between the respective characteristics, wherein each cell of a plurality of cells in the embedded array is for representing one of the respective characteristics or one of the respective relationships, wherein a first cell of the plurality of cells has a first position in the embedded array that is reserved to refer to a first characteristic of the respective characteristics, wherein a second cell of the plurality of cells has a second position in the embedded array that is reserved to refer to a second characteristic of the respective characteristics, and wherein a third cell of the plurality of cells has a third position in the embedded array that is reserved to refer to a first relationship between the first characteristic and the second characteristic, wherein the first relationship comprises a spatial relationship, and wherein a value in the third cell is associated with a measure of the spatial relationship;
determining an arrangement associated with the respective characteristics and the respective relationships between the respective characteristics based on a first analysis of the embedded array; and
detecting an abnormality in the arrangement based on a second analysis of the arrangement, wherein the abnormality relates to an event associated with the entity identity, and wherein the second analysis is performed by a trained model that was trained on respective embedded arrays associated with other users that do not include the first user.

20. The non-transitory machine-readable medium of claim 19, wherein the operations further comprise:
applying the respective embedded arrays comprising respective groups of bits of information to a neural network, wherein the respective groups of bits of information are representative of respective groups of characteristics and respective groups of relationships between characteristics of the respective groups of characteristics;
training the neural network, based on the respective groups of bits of information applied to the neural network, to create a trained neural network, wherein the trained model is the trained neural network; and
applying the bits of information of the embedded array to the trained neural network,
wherein the determining of the arrangement comprises determining, by the trained neural network, the arrangement associated with the respective characteristics and the respective relationships between the respective characteristics based on the applying of the bits of information of the embedded array to the trained neural network,
wherein the detecting of the abnormality comprises detecting, by the trained neural network, the abnormality in the arrangement based on comparing the arrangement associated with the embedded array to other arrangements associated with the respective embedded arrays, and wherein the second analysis comprises the comparing.

* * * * *